(12) United States Patent
Oyama et al.

(10) Patent No.: US 10,698,228 B2
(45) Date of Patent: Jun. 30, 2020

(54) TRANSMISSION DEVICE, RECEPTION DEVICE, AND TRANSMISSION METHOD

(71) Applicant: FUJITSU LIMITED, Kawasaki-shi, Kanagawa (JP)

(72) Inventors: Tomofumi Oyama, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/387,769

(22) Filed: Apr. 18, 2019

(65) Prior Publication Data
US 2019/0331931 A1 Oct. 31, 2019

(30) Foreign Application Priority Data
Apr. 27, 2018 (JP) .................. 2018-087113

(51) Int. Cl.
G02B 27/28 (2006.01)
H04J 14/06 (2006.01)
H04L 1/20 (2006.01)

(52) U.S. Cl.
CPC ......... *G02B 27/286* (2013.01); *G02B 27/281* (2013.01); *G02B 27/283* (2013.01); *H04J 14/06* (2013.01); *H04L 1/20* (2013.01)

(58) Field of Classification Search
CPC ....... G02B 27/28; G02B 27/286; H04J 14/06; H04L 1/20
See application file for complete search history.

(56) References Cited

U.S. PATENT DOCUMENTS

| 7,596,315 | B2* | 9/2009 | Nakashima | H04B 10/07 398/34 |
| 8,976,726 | B2* | 3/2015 | Beeler | H04B 7/18515 370/316 |
| 2010/0111531 | A1 | 5/2010 | Tanimura et al. | |
| 2011/0170869 | A1 | 7/2011 | Mandai et al. | |
| 2012/0106962 | A1* | 5/2012 | Tanimura | H04B 10/505 398/65 |
| 2019/0379461 | A1* | 12/2019 | Irie | H04B 10/572 |

FOREIGN PATENT DOCUMENTS

| JP | 2010-109705 | 5/2010 |
| JP | 2011-146795 | 7/2011 |
| JP | 2013-038639 | 2/2013 |
| JP | 2015-008356 | 1/2015 |

* cited by examiner

*Primary Examiner* — William C. Dowling
(74) *Attorney, Agent, or Firm* — Fujitsu Patent Center

(57) ABSTRACT

A transmission method includes mapping a data signal to a symbol according to a modulation mode to generate a first electric field signal and a second electric field signal, modulating a light beam based on the first electric field signal and the second electric field signal to generate a first polarized light beam and a second polarized light beam that are orthogonal to each other, multiplexing the first polarized light beam and the second polarized light beam, applying transformation processing of changing each polarization angle of the first polarized light beam and the second polarized light beam to the first electric field signal and the second electric field signal and adding polarization information indicating a change amount caused by the transformation processing for each polarization angle of the first polarized light beam and the second polarized light beam to the first electric field signal and the second electric field signal.

15 Claims, 19 Drawing Sheets

FIG. 2
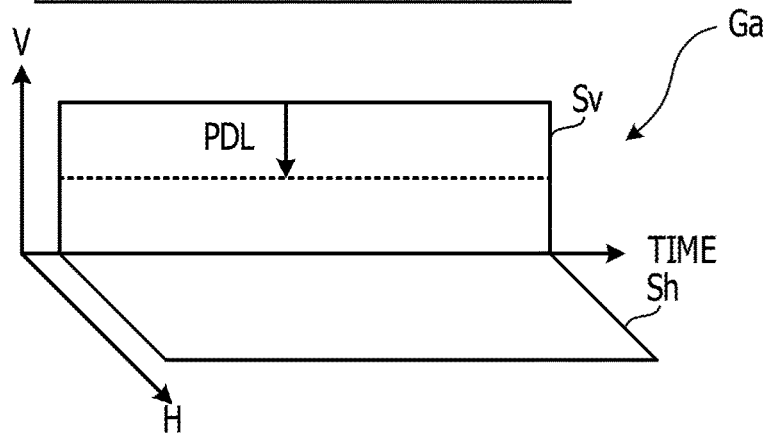
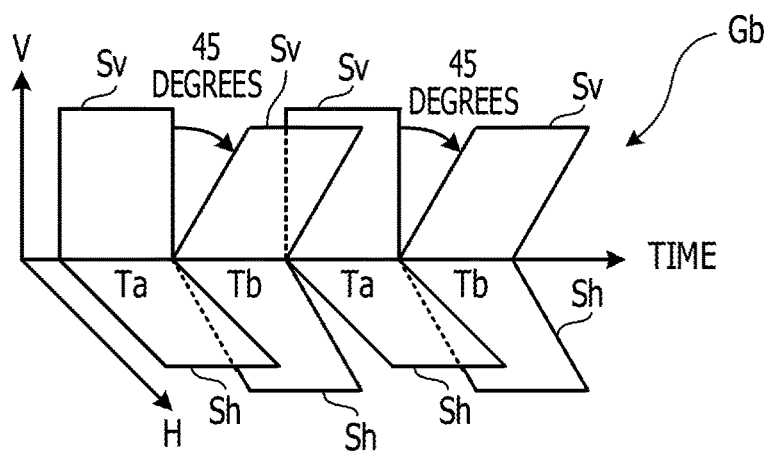
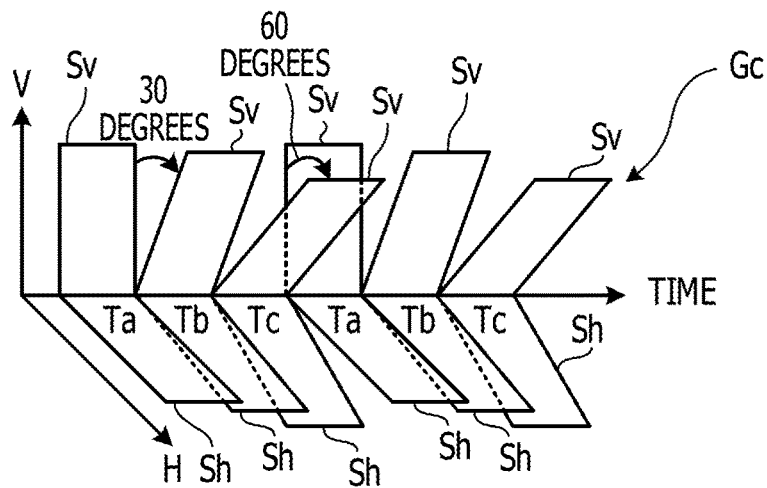

FIG. 14
THE CASE OF $\theta = 0 + n \times (\pi/2)$
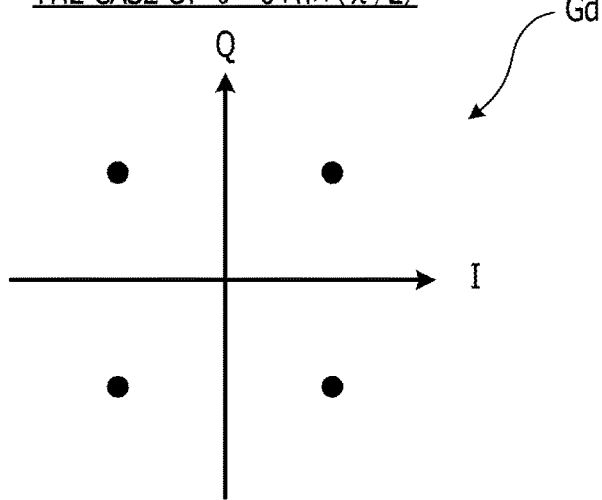
THE CASE OF $\theta = \pi/4 + n \times (\pi/2)$
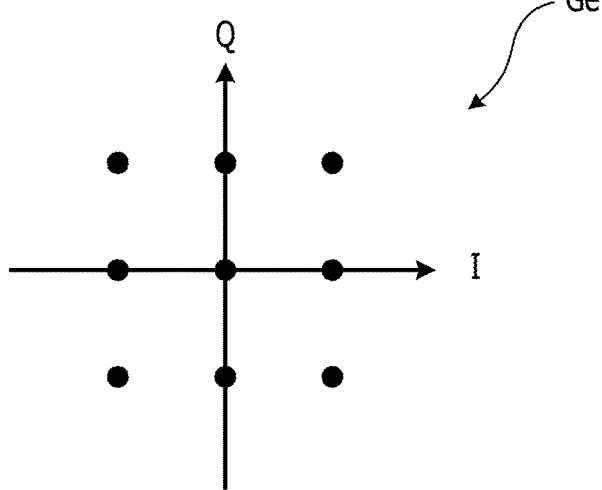
THE CASE OF $\theta = \pi/6 + n \times (\pi/2)$ OR $\pi/3 + n \times (\pi/2)$
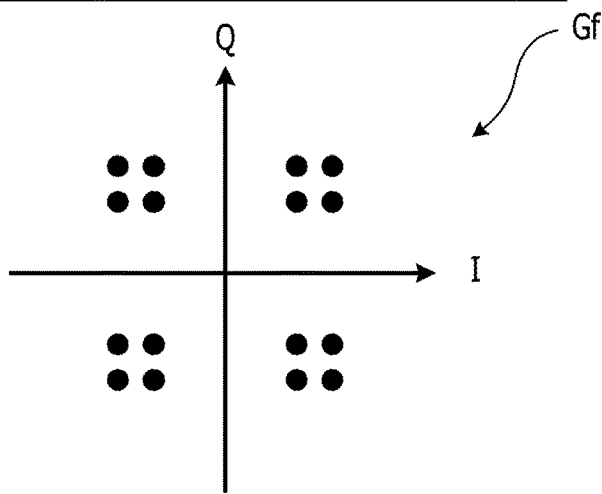

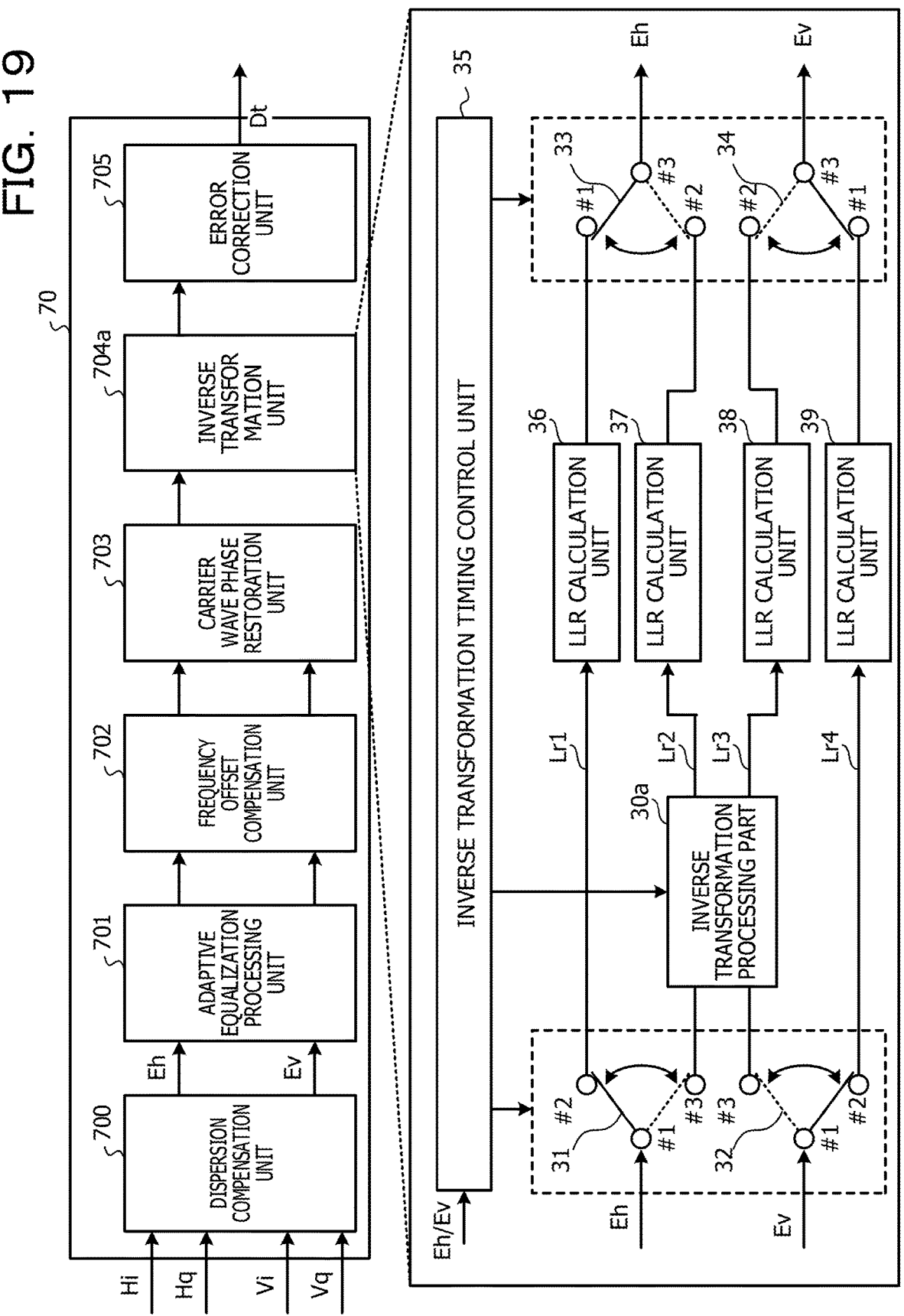

TRANSMISSION DEVICE, RECEPTION DEVICE, AND TRANSMISSION METHOD

CROSS-REFERENCE TO RELATED APPLICATION

This application is based upon and claims the benefit of priority of the prior Japanese Patent Application No. 2018-87113, filed on Apr. 27, 2018, the entire contents of which are incorporated herein by reference.

FIELD

The embodiment discussed herein is related to a transmission device, a reception device, and a transmission method.

BACKGROUND

In polarization multiplexing transmission, to reduce signal degradation caused by polarization dependent loss (PDL) of the optical fiber, the processing of rotating the polarization of optical signals has been conventionally executed to average the effect of polarization dependency of the optical fiber. As a result of the reduction of signal degradation caused by PDL, it is unnecessary for allowing for excessive margins for various design values in transmission systems adopting the polarization multiplexing transmission, enabling saving of device costs. Related techniques are disclosed in, for example, Japanese Laid-open Patent Publication Nos. 2011-146795 and 2010-109705.

Japanese Laid-open Patent Publication No. 2010-109705 describes that, to demodulate a received signal, the receiver-side digital signal processing unit gives a change of the polarized wave whose characteristics are substantially inverse to the change of the polarized wave in the transmitter side signal processor to the digital electrical signal, but the means include various complicated calculations. This method disadvantageously increases loads of demodulation processing. Japanese Laid-open Patent Publication No. 2011-146795 fails to specifically describe demodulation processing.

In consideration of the above-mentioned situation, there is a demand for providing a transmission device, a reception device, and a transmission method that can reduce signal degradation caused by PDL without increasing loads of demodulation processing.

SUMMARY

According to an aspect of the embodiments, a transmission device includes a transmission processing circuit configured to map a data signal to a symbol according to a modulation mode to generate a first electric field signal and a second electric field signal, a modulator configured to optically modulate a light beam based on the first electric field signal and the second electric field signal to generate a first polarized light beam and a second polarized light beam that are orthogonal to each other and a multiplexer configured to multiplex the first polarized light beam and the second polarized light beam, wherein the transmission processing circuit applies unitary transformation regarding the first polarized light beam and the second polarized light beam, or unitary transformation between symbols at different timings, to the first electric field signal and the second electric field signal, inserts a first reference signal having a predetermined pattern used in demodulation processing of the first electric field signal in the first electric field signal subjected to the unitary transformation, and inserts a second reference signal having a predetermined pattern used in demodulation processing of the second electric field signal in the second electric field signal subjected to the unitary transformation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a view illustrating the state where polarized light beams propagate in a transmission line;

FIG. 14 is a view illustrating an example of constellation;

FIG. 19 is a configuration view of another reception processing circuit.

DESCRIPTION OF EMBODIMENTS

Figure 1:
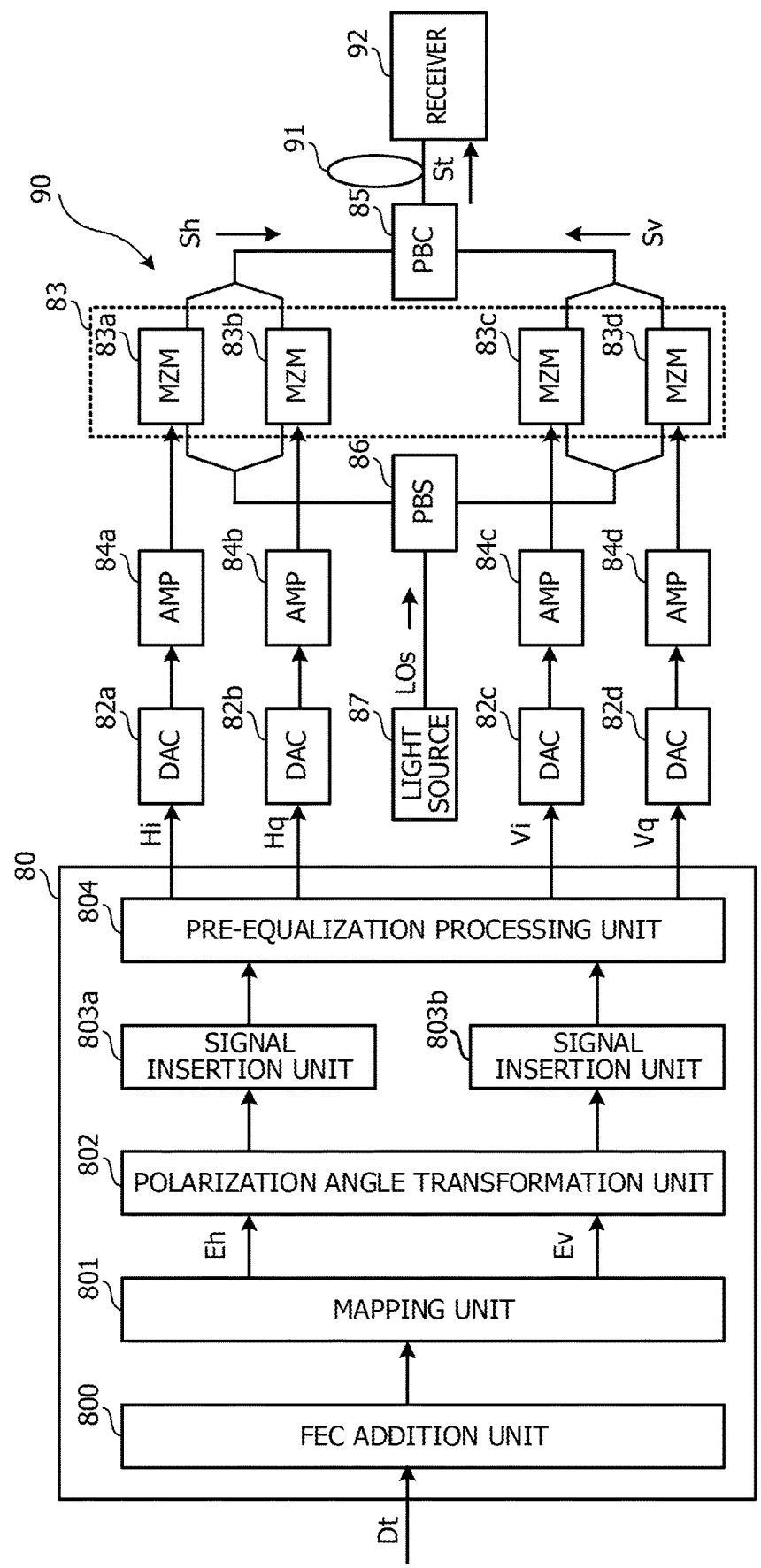
FIG. 1 is a configuration view illustrating an example of a transmitter.

FIG. 1 is a configuration view illustrating an example of a transmitter 90. Using polarization multiplexing, the transmitter 90 transmits an optical signal St to a receiver 92 via a transmission line 91 such as an optical fiber according to digital coherent optical transmission. The transmitter 90 is an example of a transmission device, and a transmission method of Example is performed according to a below-mentioned transmission procedure of the optical signal St by the transmitter 90.

The transmitter 90 has a transmission processing circuit 80, digital-to-analog converters (DAC) 82a to 82d, amplifiers (AMP) 84a to 84d, and a modulation unit 83. The modulation unit 83 includes mach-zehnder modulators (MZM) 83a to 83d. The transmitter 90 further has a polarization beam combiner (PBC) 85, a polarization beam splitter (PBS) 86, and a light source 87.

The transmission processing circuit 80 receives a data signal Dt from, for example, another device in a client network, and outputs digital signals Hi, Hq, Vi, and Vq from the data signal Dt. The data signal Dt includes, but not limited to, the Ethernet (registered trademark).

The digital signals Hi, Hq are an in-phase component and a quadrature component of an electric field signal Eh, respectively, which correspond to an H polarization component (polarized light beam Sh) of the optical signal St. The digital signals Vi, Vq are an in-phase component and a quadrature component of an electric field signal Ev, respectively, which correspond to a V polarization component (polarized light beam Sv) of the optical signal St. The electric field signal Eh is an example of a first electric field signal, and the electric field signal Ev is an example of a second electric field signal. The polarized light beam Sh is an example of first polarized light beam, and polarized light beam Sv is an example of second polarized light beam.

The transmission processing circuit 80 has a forward error correction (FEC) addition unit 800, a mapping unit 801, a polarization angle transformation unit 802, signal insertion units 803a, 803b, and a pre-equalization processing unit 804. The transmission processing circuit 80 includes, but not limited to, a digital signal processor (DSP), and may be a field programmable gate array (FPGA).

The FEC addition unit 800 inserts a FEC code that is an example of an error correcting code in the data signal Dt. The FEC code is located, for example, at the tail end of a frame of the data signal Dt. The FEC addition unit 800 outputs the data signal Dt to the mapping unit 801.

The mapping unit 801 maps the data signal Dt to symbols according to the modulation mode. The modulation mode includes, not limited to quadrature phase shift keying (QPSK), binary phase shift keying (BPSK), and quadrature amplitude modulation (QAM).

The mapping unit 801 performs serial-parallel transformation to divide the data signal Dt into two data sequences assigned to H-axis and V-axis polarization components. The mapping unit 801 maps the data signal Dt for each data sequence, and outputs the data sequences of the polarization components as the electric field signals Eh, Ev to the polarization angle transformation unit 802.

In this manner, the mapping unit 801 that is an example of a signal generation unit maps the data signal Dt to the symbol according to the modulation mode, to generate the electric field signals Eh, Ev.

The polarization angle transformation unit 802 is an example of a transformation unit, and applies unitary transformation about the polarization angle of the polarized light beams Sh, Sv to the electric field signals Eh, Ev. Before and after the unitary transformation, power and total of the polarized light beams Sh, Sv remain unchanged. As an example, the polarization angle transformation unit 802 applies transformation processing of changing the polarization angle of the polarized light beams Sh, Sv to the electric field signals Eh, Ev. The polarization angle transformation unit 802 outputs the electric field signals Eh, Ev to the signal insertion units 803a, 803b, respectively.

The signal insertion unit 803a is an example of a first insertion unit, and inserts a reference signal (first reference signal) having a predetermined pattern used to demodulate the electric field signal Eh in the electric field signal Eh outputted from the polarization angle transformation unit 802. The signal insertion unit 803b is an example of a second insertion unit, and inserts a reference signal (second reference signal) having a predetermined pattern used to demodulate the electric field signal Ev in the electric field signal Ev outputted from the polarization angle transformation unit 802.

The reference signal includes a training sequence (TS) that is a synchronizing pattern of the frame of the data signal Dt and a pilot symbol (PS) that is a test pattern. The reference signals of the signal insertion units 803a, 803b may be the same as each other or different from each other. The signal insertion units 803a, 803b output the electric field signals Eh, Ev to the pre-equalization processing unit 804.

The pre-equalization processing unit 804 applies pre-equalization processing to the electric field signals Eh, Ev. For example, the pre-equalization processing unit 804 electrically adding inverse characteristics to transmission line characteristics of the transmission line 91 to the electric field signals Eh, Ev, thereby suppressing a distortion in signal waveform due to the transmission line characteristics. The pre-equalization processing unit 804 outputs the electric field signals Eh, Ev to the DACs 82a to 82d as the digital signals Hi, Hq, Vi, and Vq.

The DACs 82a to 82d transform the digital signals Hi, Hq, Vi, and Vq into respective analog signals. The analog signals are amplified by the AMPs 84a to 84d and then, inputted to the MZMs 83a to 83d. The DACs 82a to 82d may be constituted in the transmission processing circuit 80.

The light source 87 is constituted of, for example, a laser diode, and outputs transmission light beam LOs having a predetermined center frequency as an example of light to the PBS 86. The PBS 86 divides the transmission light beam LOs into an H axis and a V axis (polarization axes). The H polarization component of the transmission light beam LOs is inputted to each of the MZMs 83a, 83b, and the V polarization component of the transmission light beam LOs is inputted to each of the MZMs 83c, 83d.

The modulation unit 83 is an example of a polarized light generation unit, and optically modulates the transmission light beam LOs based on the electric field signals Eh, Ev, thereby generating polarized light beams Sh, Sv that are orthogonal to each other. The MZMs 83a to 83d optically modulate the transmission light beam LOs based on analog signals from the DACs 82a to 82d. More specifically, the MZMs 83a, 83b optically modulate the H-axis component of the transmission light beam LOs based on the analog signals from the DACs 82a, 82b, and the MZMs 83c, 83d optically modulate the V-axis component of the transmission light beam LOs based on the analog signals from the DACs 82c, 82d.

The H-axis component and the V-axis component of the optically-modulated transmission light beam LOs are inputted as the polarized light beams Sh, Sv to the PBC 85. The PBC 85 polarizes and combines the H-axis component and the V-axis component of the transmission light beam LOs to generate the optical signal St, and outputs the generated optical signal St to the transmission line 91.

As described above, the PBC 85 optically multiplexes the polarized light beams Sh, Sv, and outputs the multiplexed optical signal St as polarized and multiplexed light beam to the transmission line 91. The PBC 85 is an example of a multiplexing unit. The polarized light beams Sh, Sv of the optical signal St are cyclically rotated by rotation processing of the polarization angle transformation unit 802.

To cyclically rotate the polarization angle of the polarized light beams Sh, Sv, the polarization angle transformation unit 802 rotates signal points in an I-Q plane of the electric field signals Eh, Ev. The polarization angle cyclically rotates thereby averaging the effect of polarization dependency of the transmission line 91 on the optical signal St to reduce PDL.

FIG. 2 is a view illustrating the state where the polarized light beams Sh, Sv propagate in the transmission line 91. A sign Ga represents polarized light beams Sh, Sv in Comparative Example, and signs Gb, Gc represent the polarized light beams Sh, Sv in Example.

As expressed by the sign Ga, in the case where polarization rotation is not performed (see "No polarization rotation"), the polarized light beam Sh oscillates along the H axis at all times, and the polarized light beam Sv oscillates along the V axis at all times. That is, the polarization angle of the polarized light beams Sh, Sv becomes substantially fixed. For example, due to the effect of polarization dependency of the transmission line 91, the polarized light beam Sv decreases its power level by reason of PDL as expressed by a dotted line.

On the contrary, in the case where polarization rotation is performed in two patterns as expressed by the sign Gb (see "polarization rotation (two patterns)"), the polarized light beams Sh, Sv oscillate along the H axis and the V axis for a time Ta, respectively, and then, oscillate in directions rotated from the H axis and the V axis by 45 degrees for a subsequent time Tb, respectively. That is, the polarization angle of the polarized light beams Sh, Sv changes from a reference angle by 45 degrees for the time Tb. At this time, the relative angle between the polarized light beams Sh, Sv is maintained to be about 90 degrees for the times Ta, Tb. The polarized light beams Sh, Sv repeat the state for the times Ta, Tb. The rotational angle is not limited to 45 degrees. The durations of the times Ta, Tb may be the same as each other or different from each other.

As described above, since the polarization angle of the polarized light beams Sh, Sv intermittently change, the effect of polarization dependency of the transmission line 91 on the optical signal St is averaged to reduce signal degradation caused by PDL.

In the case where polarization rotation is performed in three patterns (see "Polarization rotation (three patterns)") as expressed by the sign Gc, the polarized light beams Sh, Sv oscillate along the H axis and the V axis for a time Ta, respectively, and then, oscillate in directions rotated from the H axis and the V axis by 30 degrees for a subsequent time Tb, respectively. That is, the polarization angle of the polarized light beams Sh, Sv changes from a reference angle by 30 degrees for the time Tb.

The polarized light beams Sh, Sv oscillate in directions rotate from the H axis and the V axis by 60 degrees for a time Tc following the time Tb, respectively. That is, the polarization angle of the polarized light beams Sh, Sv changes from the reference angle by 60 degrees for the time Tc. The relative angle between the polarized light beams Sh, Sv is maintained to be about 90 degrees for the times Ta to Tc. The polarized light beams Sh, Sv repeat the state for the times Ta to Tc. The rotational angle is not limited to 30 degrees and 60 degrees. The durations of the times Ta to Tc may be the same as each other or different from each other.

Since the polarization angle of the polarized light beams Sh, Sv continuously change from the reference angle to a plurality of angles (that is, 30 degrees and 60 degrees) as described above, as compared with the case of the sign Gb, randomness of the polarization angle increases to reduce PDL more effectively.

Figure 3:
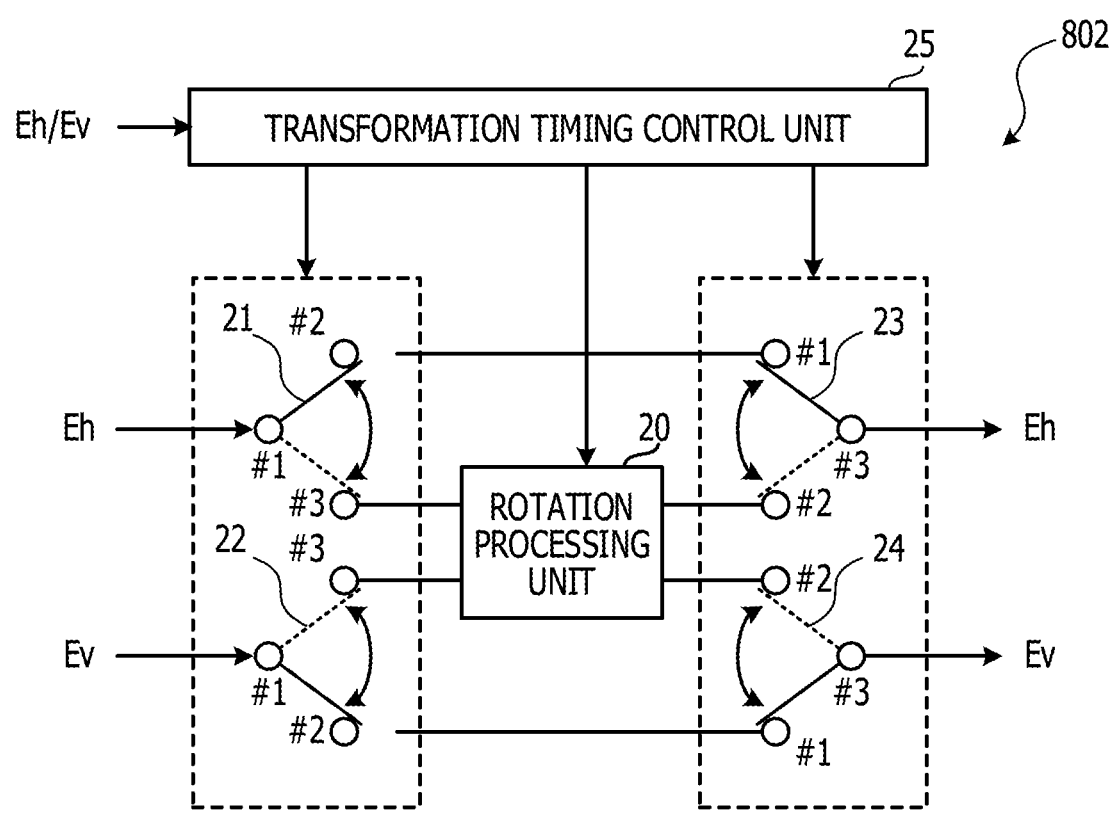
FIG. 3 is a configuration view illustrating an example of a polarization angle transformation unit.

FIG. 3 is a configuration view illustrating an example of the polarization angle transformation unit 802. The polarization angle transformation unit 802 has a rotation processing unit 20, switches 21 to 24, and a transformation timing control unit 25.

The switches 21, 22 each include an input terminal #1 and output terminals #2, #3, and the electric field signals Eh, Ev are inputted to the input terminals #1, #2, respectively. The switches 23, 24 each include an input terminals #1, #2 and an output terminal #3, and the electric field signals Eh, Ev are outputted from each of the output terminal #3.

The output terminal #2 of the switch 21 is connected to the input terminal #1 of the switch 23, and the output terminal #2 of the switch 22 is connected to the input terminal #1 of the switch 24. The output terminals #3 of the switches 21, 22 and the input terminals #2 of the switches 23, 24 each are connected to the rotation processing unit 20.

The rotation processing unit 20 executes the rotation processing of the polarized light beams Sh, Sv as an example of polarization angle transformation processing. Thus, in the case where the input terminals #1 of the switches 21, 22 are connected to the output terminal #2 of the switches 21, 22, and the output terminals #3 of the switches 23, 24 are connected to the input terminals #1 of the switches 23, 24, the electric field signals Eh, Ev do not pass through the rotation processing unit 20 and therefore, the rotation processing of the polarized light beams Sh, Sv is not executed. In the case where the input terminals #1 of the switches 21, 22 are connected to the output terminal #3 of the switches 21, 22, and the output terminals #3 of the switches 23, 24 are connected to the input terminals #2 of the switches 23, 24, the electric field signals Eh, Ev pass through the rotation processing unit 20 and therefore, the rotation processing of the polarized light beams Sh, Sv is executed.

The transformation timing control unit 25 switches the switches 21 to 24 every predetermined time. For example, the transformation timing control unit 25 manages the times from symbol data of the electric field signals Eh, Ev in the unit of symbol. The transformation timing control unit 25 designates the rotational angle θ of the polarized light beams Sh, Sv to rotation processing unit 20 for each time.

In the case of polarization rotation expressed by the sign Gb in FIG. 2, the transformation timing control unit 25 switches the switches 21 to 24 such that the electric field signals Eh, Ev do not pass through the rotation processing unit 20 for the time Ta of one symbol, and switches the switches 21 to 24 such that the electric field signals Eh, Ev passes through the rotation processing unit 20 for the time Tb of one symbol. The transformation timing control unit 25 designates 30 degrees as the rotational angle θ of the polarized light beams Sh, Sv for the time Tb.

In the case of polarization rotation expressed by the sign Gc in FIG. 2, the transformation timing control unit 25 switches the switches 21 to 24 such that the electric field signals Eh, Ev do not pass through the rotation processing unit 20 for the time Ta of one symbol, and switches the switches 21 to 24 such that the electric field signals Eh, Ev passes through the rotation processing unit 20 for the times Tb, Tc of one symbol. The transformation timing control unit 25 designates 30 degrees as the rotational angle θ of the polarized light beams Sh, Sv for the time Tb, and designates 60 degrees as the rotational angle θ of the polarized light beams Sh, Sv for the time Tc.

Figure 4:
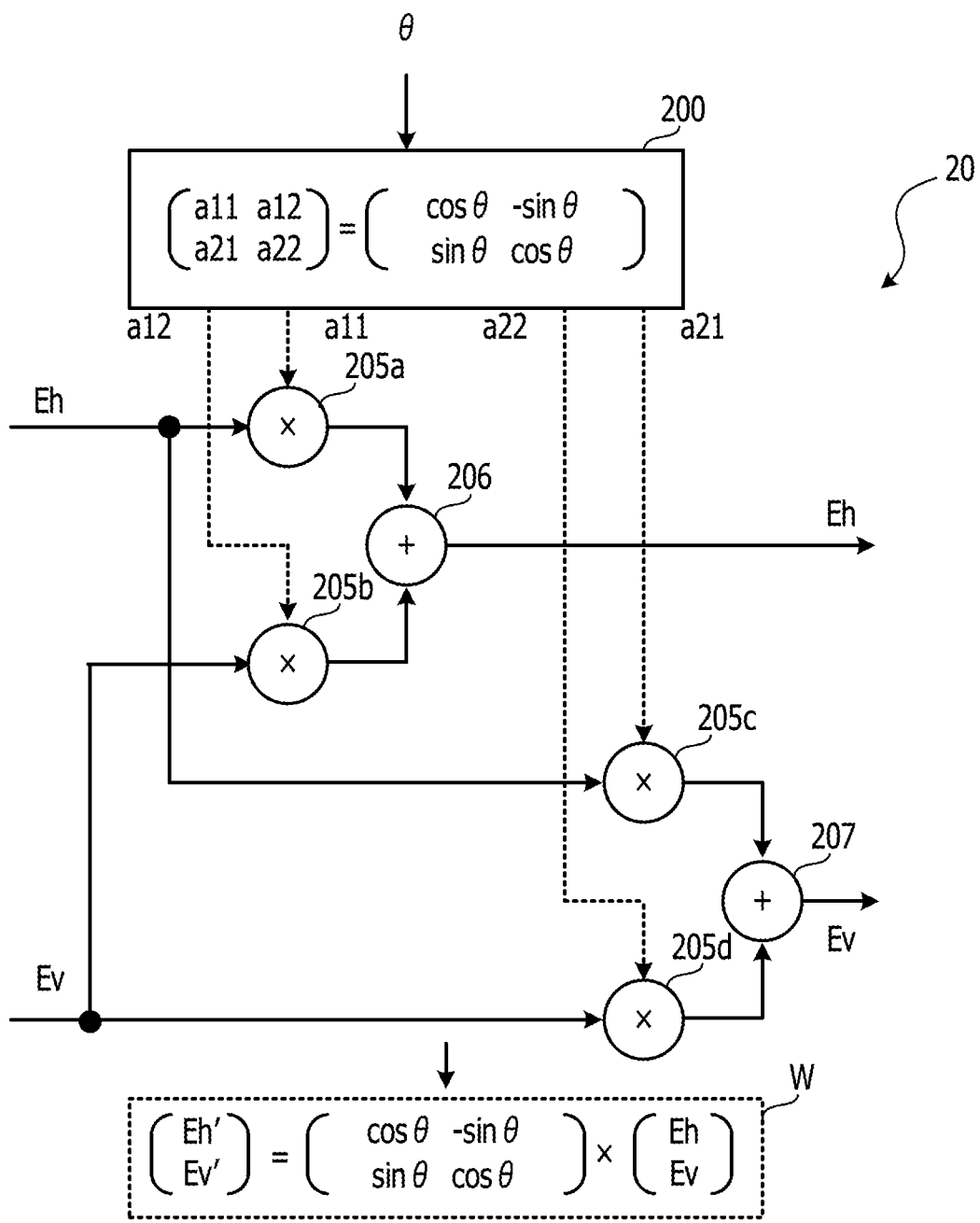
FIG. 4 is a configuration view illustrating an example of a rotation processing unit.

FIG. 4 is a configuration view illustrating an example of the rotation processing unit 20. The rotation processing unit 20 has a polarization rotation generator 200, multipliers 205a to 205d, and adders 206, 207.

The electric field signal Eh is inputted to the multipliers 205a, 205c, and the electric field signal Ev is inputted to the multipliers 205b, 205d. The polarization rotation generator 200 outputs operation parameters a11, a12, a21, a22 for rotating the polarized light beam to each of the multipliers 205a to 205d.

$$a11 = \cos\theta \quad (1)$$

$$a12 = -\sin\theta \quad (2)$$

$$a21 = \sin\theta \quad (3)$$

$$a22 = \cos\theta \quad (4)$$

The operation parameters a11, a12, a21, and a22 are elements of a matrix for operating polarization rotation, and are expressed by the above-mentioned formulas (1) to (4). In the formulas (1) to (4), the rotational angle θ is inputted from the transformation timing control unit 25.

The multiplier 205a multiplies a signal value of the electric field signal Eh by the operation parameter a11, and outputs the value found by multiplication to the adder 206. The multiplier 205b multiplies a signal value of the electric field signal Ev by the operation parameter a12, and outputs the value found by multiplication to the adder 206. The adder 206 sums the values from the multipliers 205a, 205b, thereby acquiring the electric field signal Eh after polarization rotation to output the electric field signal Eh.

The multiplier 205c multiplies the signal value of the electric field signal Eh by the operation parameter a21 and outputs the value found by multiplication to the adder 207. The multiplier 205d multiplies the signal value of the electric field signal Ev by the operation parameter a22, and outputs the value found by multiplication to the adder 207. The adder 207 sums the values from the multipliers 205c, 205d, thereby acquiring the electric field signal Ev after polarization rotation to output the electric field signal Ev.

When the electric field signals Eh, Ev after polarization rotation is described as Eh', Ev', as expressed by a sign W, Eh', Ev' are matrix elements found by multiplying a matrix with 2 rows×1 column using elements as electric field signals Eh, Ev by a matrix with 2 rows×2 columns using elements as the operation parameters a11, a12, a21, and a22.

In this manner, the rotation processing unit 20 rotates the polarized light beams Sh, Sv of the optical signal St. The signal insertion units 803a, 803b inserts TS and PS in the electric field signals Eh, Ev outputted from the polarization angle transformation unit 802. For this reason, TS and PS are outputted as the optical signal St with the polarization angle unchanged. As described later, unitary transformation is not limited to the above-mentioned rotation processing of the polarization angle.

Figure 5:
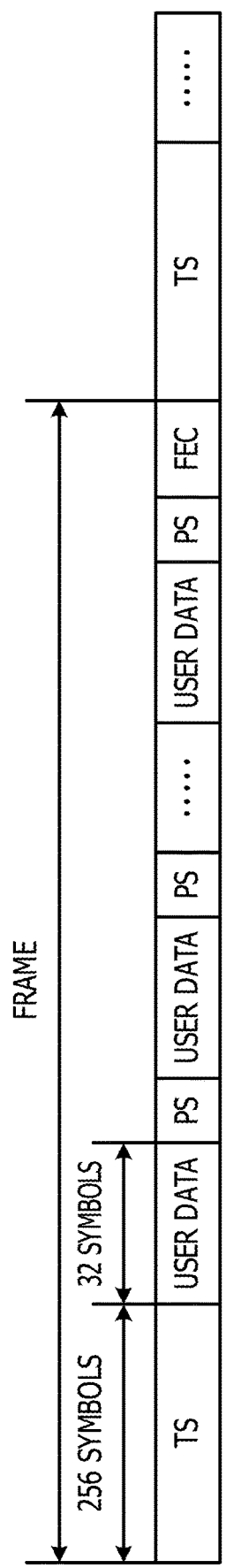
FIG. 5 is a configuration view illustrating an example of optical signals.

FIG. 5 is a configuration view illustrating an example of the optical signal St. As an example, TS is inserted in a head of the frame, and the length is, for example, 256 symbols. PS is inserted in every user data of 32 symbols. The length of PS is not limited.

TS and PS are data of predetermined pattern, and TS and PS are not subjected to the above-mentioned rotation processing. For this reason, the receiver 92 may execute demodulation processing at low loads based on TS and PS.

Figure 6:
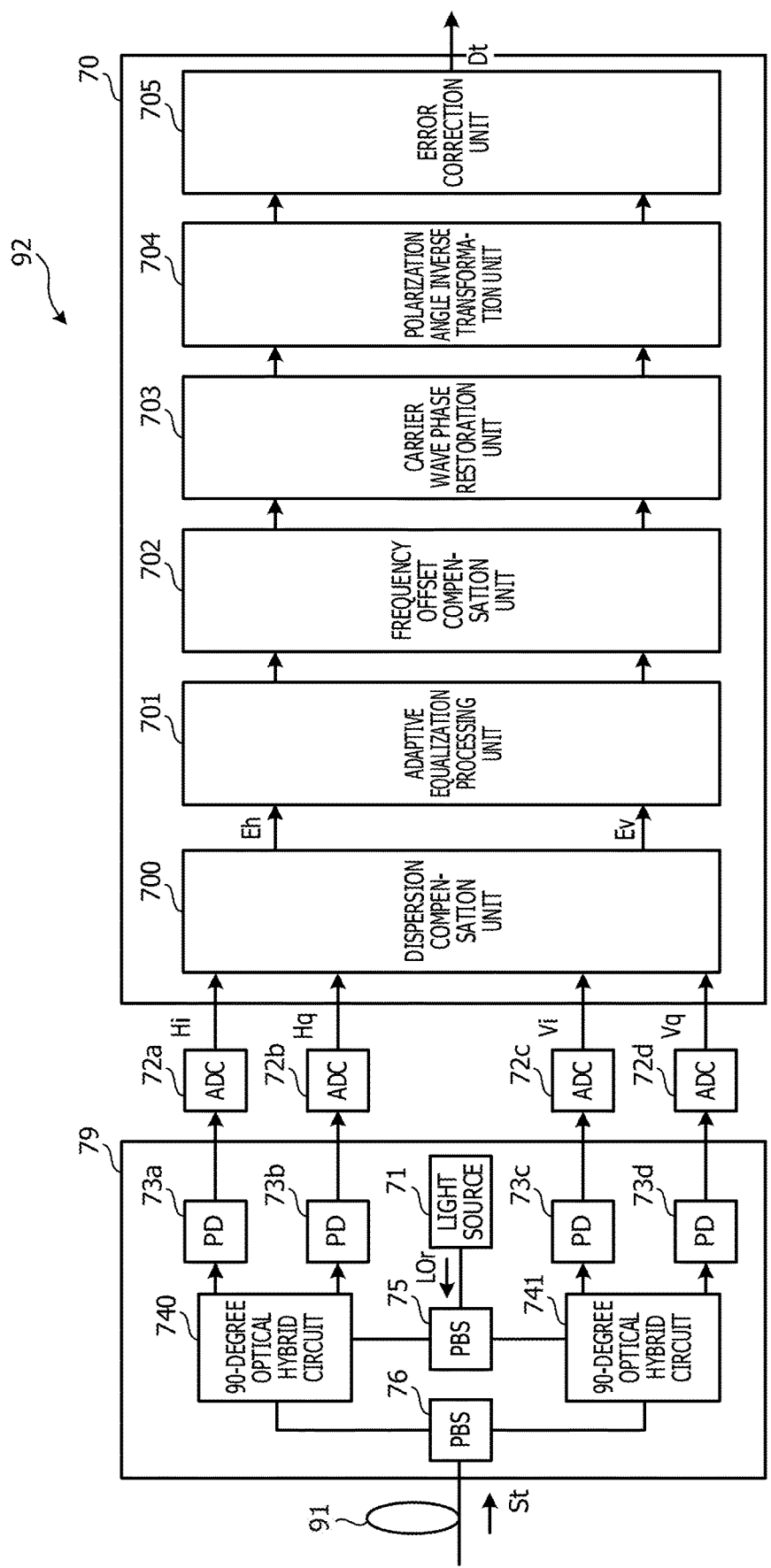
FIG. 6 is a configuration view illustrating an example of a receiver.

FIG. 6 is a configuration view illustrating an example of the receiver 92. The receiver 92 receives the optical signal St from the transmitter 90. The receiver 92 is an example of a reception device.

The receiver 92 has a reception processing circuit 70, an analog-to-digital convertor (ADC) 72a to 72d, and a front end unit 79. The front end unit 79 has a light source 71, balance-type photodiodes (PD) 73a to 73d, 90-degree optical hybrid circuits 740, 741, and PBSs 75, 76.

The front end unit 79 is an example of a signal transformation unit, receives the optical signal St from the transmitter, divides the optical signal St into the polarized light beams Sh, Sv, and transforms the polarized light beams Sh, Sv into the electric field signals Eh, Ev, respectively. The PBS 76 divides the optical signal St into the polarized light beams Sh, Sv, and outputs the polarized light beams Sh, Sv to the 90-degree optical hybrid circuits 740, 741, respectively. The light source 71 is configured of, for example, a laser diode, and inputs local light LOr having a predetermined center frequency to the PBS 75. The PBS 75 divides the local light LOr into the H-axis component and the V-axis component, and outputs the H-axis component and the V-axis component to the 90-degree optical hybrid circuits 740, 741, respectively.

The 90-degree optical hybrid circuit 740 has a waveguide for allowing the polarized light beam Sh to interfere with the H-axis component of the local light LOr to detect the polarized light beam Sh. The 90-degree optical hybrid circuit 740 outputs an optical component corresponding to amplitude and phase of the in-phase component and the quadrature component, as a detection result, to the PDs 73a, 73b.

The 90-degree optical hybrid circuit 741 has a waveguide for allowing the polarized light beam Sv to interfere with the V-axis component of the local light LOr to detect the polarized light beam Sv. The 90-degree optical hybrid circuit 741 outputs an optical component corresponding to amplitude and phase of the in-phase component and the quadrature component, as a detection result, to the PDs 73c, 73d.

The PDs 73a to 73d transform the optical components inputted from the 90-degree optical hybrid circuits 740, 741 into electrical signals, and outputs the electrical signals to the respective ADCs 72a to 72d. The ADCs 72a to 72d transforms the electrical signals inputted from the PDs 73a to 73d into the digital signals Hi, Hq, Vi, and Vq, respectively. The digital signals Hi, Hq, Vi, and Vq are inputted to the reception processing circuit 70.

The reception processing circuit 70 has a dispersion compensation unit 700, an adaptive equalization processing unit 701, a frequency offset compensation unit 702, a carrier wave phase restoration unit 703, a polarization angle inverse transformation unit 704, and an error correction unit 705. The reception processing circuit 70 includes, not limited to, DSP and FPGA. The reception processing circuit 70 may have other functions.

The dispersion compensation unit 700 compensates waveform distortion of the optical signal St, which is caused by wavelength dispersion on the transmission line 91, based on a fixed parameter. The dispersion compensation unit 700 outputs the digital signals Hi, Hq, Vi, and Vq to the adaptive equalization processing unit 701 as the electric field signals Eh, Ev.

The adaptive equalization processing unit 701 applies adaptive equalization processing to the electric field signals Eh, Ev. More specifically, the adaptive equalization processing unit 701 compensates waveform distortion of the optical signal St, which is caused by wavelength dispersion on the transmission line 91 and nonlinear optical effects, based on a dynamic parameter.

The adaptive equalization processing unit 701 compensates the degradation of the optical signal St. More specifically, the adaptive equalization processing unit 701 gives characteristics that are inverse to characteristics of the transmission line 91 to the electric field signals Eh, Ev through a finite impulse response (FIR), thereby correcting the waveform of the electric field signals Eh, Ev. The adaptive equalization processing unit 701 outputs the electric field signals Eh, Ev to the frequency offset compensation unit 702.

The frequency offset compensation unit 702 compensates a frequency difference and a phase difference between the carrier frequency of the electric field signals Eh, Ev and the light source 71, such that the electric field signals Eh, Ev are normally demodulated by constellation (signal space diagram) corresponding to the modulation mode. The frequency offset compensation unit 702 outputs the electric field signals Eh, Ev to the carrier wave phase restoration unit 703.

The carrier wave phase restoration unit 703 removes a noise component from the electric field signals Eh, Ev, estimates a correct carrier wave phase, and synchronizes the phase of the electric field signals Eh, Ev with the estimated carrier wave phase. The carrier wave phase restoration unit 703 outputs the electric field signals Eh, Ev to the polarization angle inverse transformation unit 704.

The adaptive equalization processing unit 701, frequency offset compensation unit 702, and the carrier wave phase restoration unit 703 are an example of a demodulation processing unit, and demodulates the electric field signals Eh, Ev based on PS inserted from the signal insertion units 803*a*, 803*b*.

The adaptive equalization processing unit 701 determines an error of a tap coefficient, for example, from a known pattern of PS, and updates the tap coefficient based on the determination result. The frequency offset compensation unit 702 determines a frequency difference and a phase difference from the known pattern of PS, and compensates the differences. The carrier wave phase restoration unit 703 estimates a correct carrier wave phase from the known pattern of PS, and synchronizes the phase of the electric field signals Eh, Ev with the estimated carrier wave phase.

As described above, since PS is not subjected to rotation processing of the polarization angle, the adaptive equalization processing unit 701, the frequency offset compensation unit 702, and the carrier wave phase restoration unit 703 may execute the demodulation processing at low loads without any complicated operation processing.

The polarization angle inverse transformation unit 704 is an example of an inverse transformation unit, and applies transformation processing that is inverse to transformation processing of the polarization angle transformation unit 802 to the electric field signals Eh, Ev. This returns portions subjected to polarization rotation in the electric field signals Eh, Ev to the initial state. The polarization angle inverse transformation unit 704 outputs the electric field signals Eh, Ev to the error correction unit 705.

The error correction unit 705 regenerates the data signal Dt from the electric field signals Eh, Ev, and executes error correction processing of the data signal Dt by soft decision based on the FEC code added to the data signal Dt. The error correction processing is executed for each frame of the data signal Dt. The data signal Dt thus restored is outputted to another device.

Figure 7:
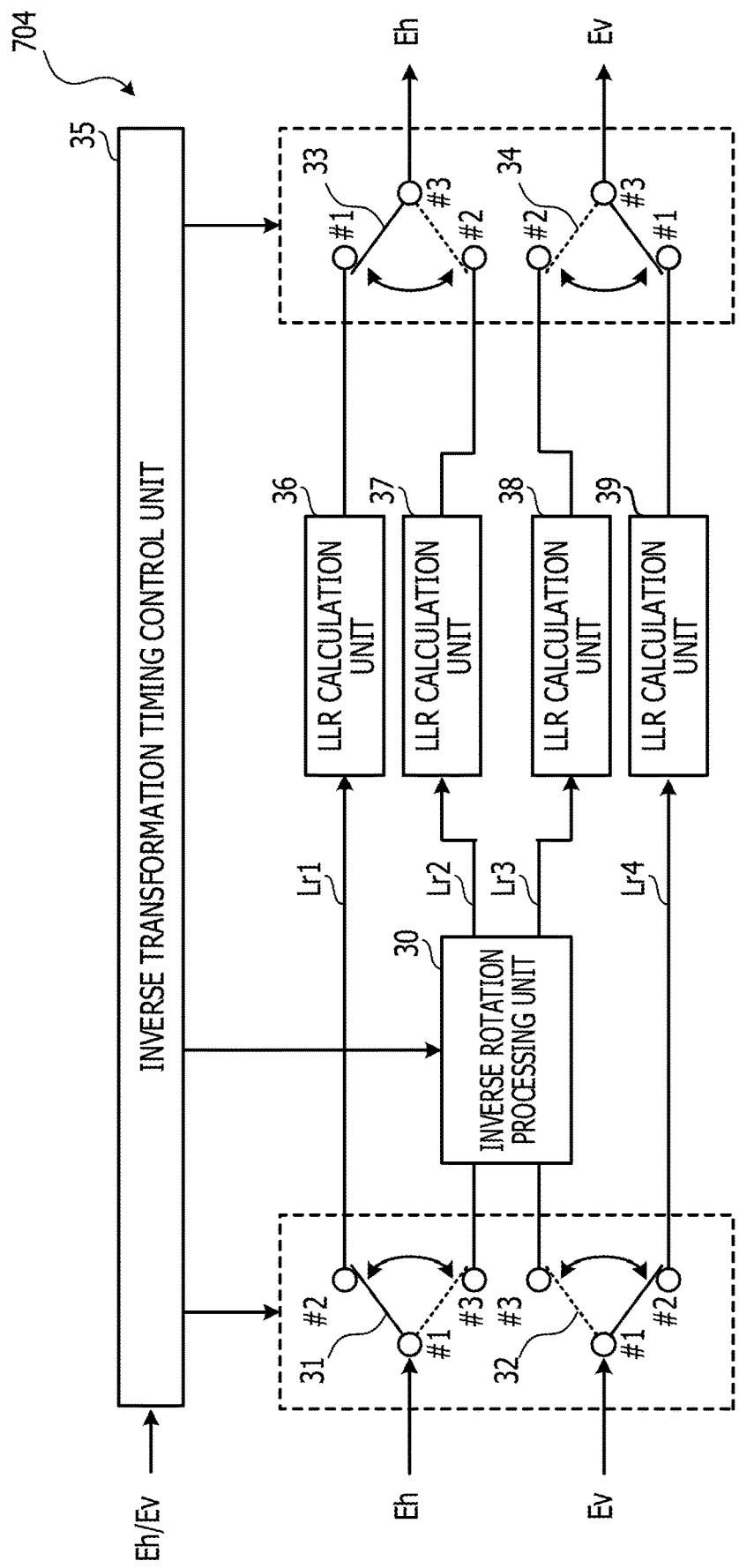
FIG. 7 is a configuration view illustrating an example of a polarization angle inverse transformation unit.

FIG. 7 is a configuration view illustrating an example of the polarization angle inverse transformation unit 704. The polarization angle inverse transformation unit 704 has an inverse rotation processing unit 30, switches 31 to 34, log likelihood ratio (LLR) calculation units 36 to 39, and an inverse transformation timing control unit 35.

The switches 31, 32 each include an input terminal #1 and output terminals #2, #3, and the electric field signals Eh, Ev are inputted to each of the input terminals #1. The switches 33, 34 each include input terminals #1, #2 and an output terminal #3, and the electric field signals Eh, Ev are outputted from each of the output terminals #3.

The output terminal #2 of the switch 31 and the input terminal #1 of the switch 33 are connected to the LLR calculation unit 36, and the output terminal #2 of the switch 32 and the input terminal #1 of the switch 34 are connected to the LLR calculation unit 39. The output terminals #3 of the switches 31, 32 are connected to the inverse rotation processing unit 30. The input terminals #2 of the switches 33, 34 are connected to the LLR calculation unit 37, 38, respectively. The inverse rotation processing unit 30 is connected to the output terminals #3 of the switches 31, 32 on the input side and are connected to the LLR calculation units 37, 38 on the output side.

The inverse rotation processing unit 30 execute inverse rotation processing of restoring the rotation processing of the polarized light beams Sh, Sv. For this reason, in the case where the input terminals #1 of the switches 31, 32 are connected to the output terminal #2 of the switches 31, 32, and the output terminals #3 of the switches 33, 34 are connected to the input terminals #1 of the switches 33, 34, the electric field signals Eh, Ev do not pass through the inverse rotation processing unit 30 and thus, the inverse rotation processing of the polarized light beams Sh, Sv is not executed. In the case where the input terminals #1 of the switches 31, 32 are connected to the output terminals #3 of the switches 31, 32, and output terminals #3 of the switches 33, 34 are connected to the input terminals #2 of the switches 33, 34, the electric field signals Eh, Ev passes through the inverse rotation processing unit 30 and thus, the inverse rotation processing of the polarized light beams Sh, Sv is executed.

The inverse transformation timing control unit 35 switches the switches 31 to 34 every predetermined time. For example, the inverse transformation timing control unit 35 manages the time from symbol data of the electric field signals Eh, Ev in unit of symbol. The inverse transformation timing control unit 35 designates the rotational angle θ of the polarized light beams Sh, Sv to the inverse rotation processing unit 30 for each time. In sync with the transformation timing control unit 25 of the transmitter 90, the inverse transformation timing control unit 35 switches the switches 31 to 34 and designates the rotational angle θ.

The electric field signal Eh that is not subjected to the transformation processing of the polarization angle transformation unit 802 flows in a lane Lr1 connecting the output terminal #2 of the switch 31 to the input terminal #1 of the switch 33. For the electric field signal Eh, the LLR calculation unit 36 calculates a log likelihood ratio (LLR) used for soft decision of the error correction unit 705 based on the power level of TS. LLR is added to the electric field signal Eh, and is inputted to the error correction unit 705.

The electric field signal Eh that is not subjected to the transformation processing of the polarization angle transformation unit 802 flows in a lane Lr2 connecting the output terminal #3 of the switch 31 to the input terminal #2 of the switch 33. For the electric field signal Eh, the LLR calculation unit 37 calculates LLR based on the power level of TS as in the above-mentioned manner. LLR is added to the electric field signal Eh, and is inputted to the error correction unit 705.

The electric field signal Ev that is not subjected to the transformation processing of the polarization angle transformation unit 802 flows in a lane Lr3 connecting the output terminal #3 of the switch 32 to the input terminal #2 of the switch 34. For the electric field signal Ev, the LLR calculation unit 38 calculates LLR based on the power level of TS as in the above-mentioned manner. LLR is added to the electric field signal Ev, and is inputted to the error correction unit 705.

The electric field signal Ev that is not subjected to the transformation processing of the polarization angle transformation unit 802 flows in a lane Lr4 connecting the output terminal #2 of the switch 32 to the input terminal #1 of the switch 34. For the electric field signal Ev, the LLR calculation unit 39 calculates LLR based on the power level of TS as in the above-mentioned manner. LLR is added to the electric field signal Ev, and is inputted to the error correction unit 705.

Each of the LLR calculation units 36 to 39 compares, for example, the power level of TS with ideal power level, and detects power level of a noise component in the transmission line 91 based on the comparison result. Then, each of the LLR calculation units 36 to 39 calculates LLR from the calculation result. The LLR calculation units 36 to 39 are an example of first to fourth calculation units, respectively.

As described above, for the electric field signal Eh or Ev, the LLR calculation units 36 to 39 each calculates LLR from TS according to the presence/absence of the rotation processing. In this manner, the error correction unit 705 may perform error correction based on accurate LLR. In this example, a parameter used for soft decision of the error correction unit 705 includes, but not limited to, LLR.

In the transmitter 90, TS is inserted in the signal insertion units 803a, 803b at the subsequent stage of the polarization angle transformation unit 802 and however, the present disclosure is not limited to this.

Figure 8:
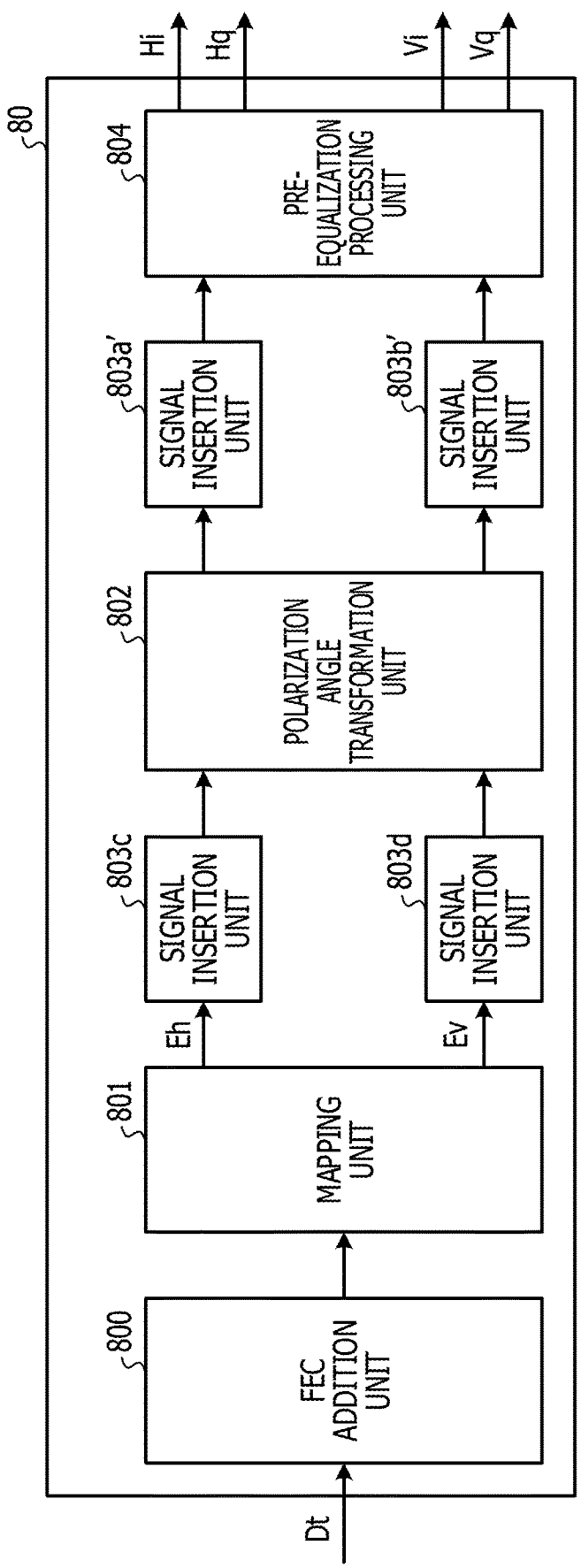
FIG. 8 is a configuration view illustrating another example of a transmission processing circuit.

FIG. 8 is a configuration view illustrating another example of the transmission processing circuit 80. The same constituents in FIG. 8 as those in FIG. 1 are given the same reference numerals, and description thereof is omitted.

Unlike the example illustrated in FIG. 1, in the transmission processing circuit 80 in this example, signal insertion units 803c, 803d are provided between the mapping unit 801 and the polarization angle transformation unit 802. The signal insertion units 803c, 803d insert TS in the electric field signals Eh, Ev, respectively, before the rotation processing of the polarized light beams Sh, Sv.

As compared to the example illustrated in FIG. 1, in the transmission processing circuit 80 in this example, signal insertion units 803a', 803b' are provided in place of the signal insertion units 803a, 803b. The signal insertion units 803a', 803b' insert only PS in the electric field signals Eh, Ev, respectively.

Figure 9:
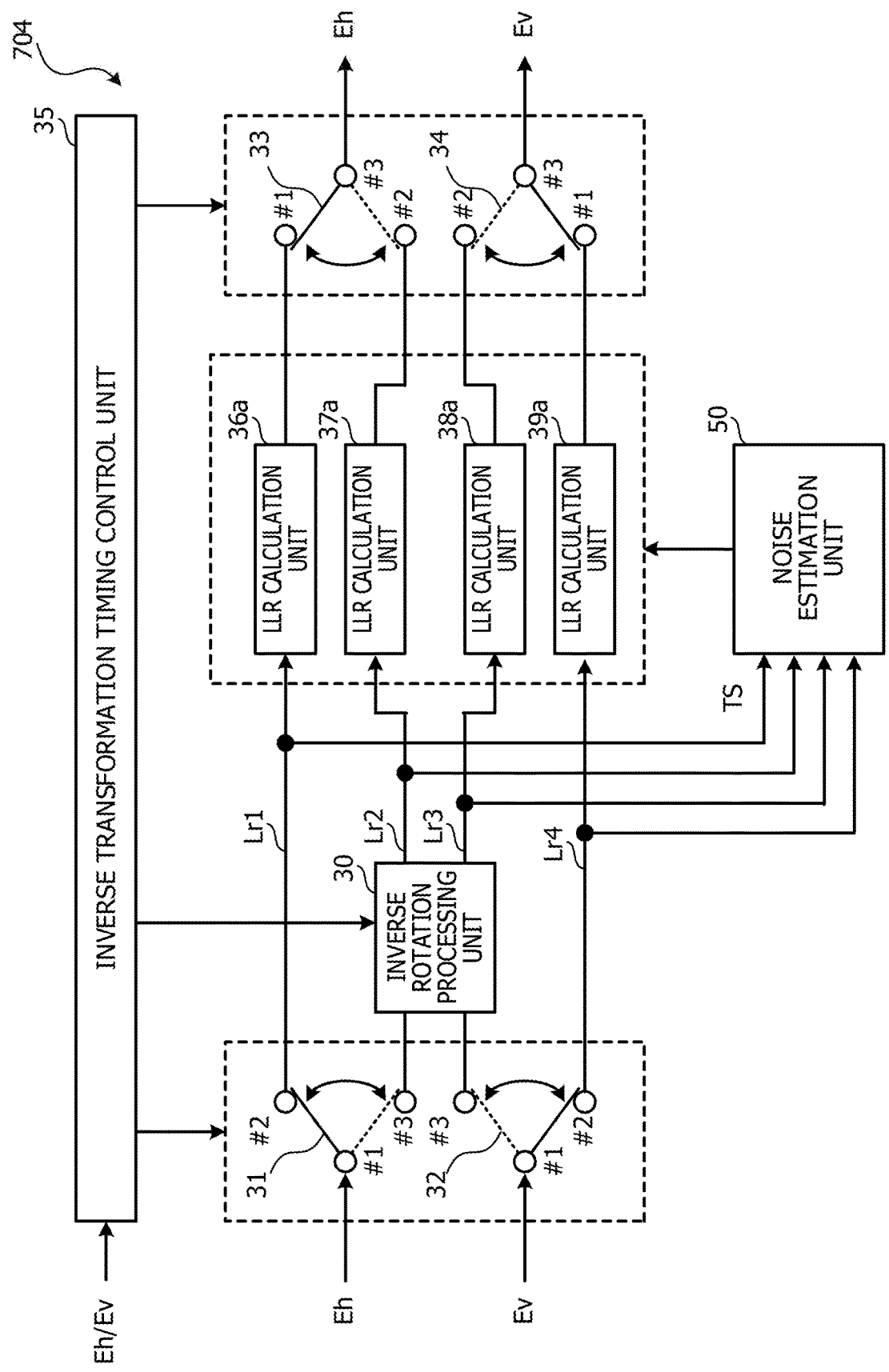
FIG. 9 is a configuration view illustrating another example of the polarization angle inverse transformation unit.

FIG. 9 is a configuration view illustrating another example of the polarization angle inverse transformation unit 704. The same constituents in FIG. 9 as those in FIG. 7 are given the same reference numerals, and description thereof is omitted.

Unlike the polarization angle inverse transformation unit 704 in FIG. 7, in the polarization angle inverse transformation unit 704 in this example, LLR calculation units 36a to 39a are provided in place of the LLR calculation units 36 to 39, and a noise estimation unit 50 is further provided. The noise estimation unit 50 extracts TS from the electric field signal Eh or Ev in each of the lanes Lr1 to Lr4, and estimates the power level of noise in the transmission line 91 for each of the lane Lr1 to Lr4 according to TS and the rotation processing of the polarization angle transformation unit 802. The noise estimation unit 50 notifies noise power level to the LLR calculation units 36a to 39a.

The LLR calculation units 36a to 39a calculates LLR based on the noise power level, and outputs the LLR to the error correction unit 705. For this reason, in this example, the above-mentioned advantageous effect may be acquired.

Next, advantageous effects of the transmitter 90 and the receiver 92 in Example will be described.

Figure 10:
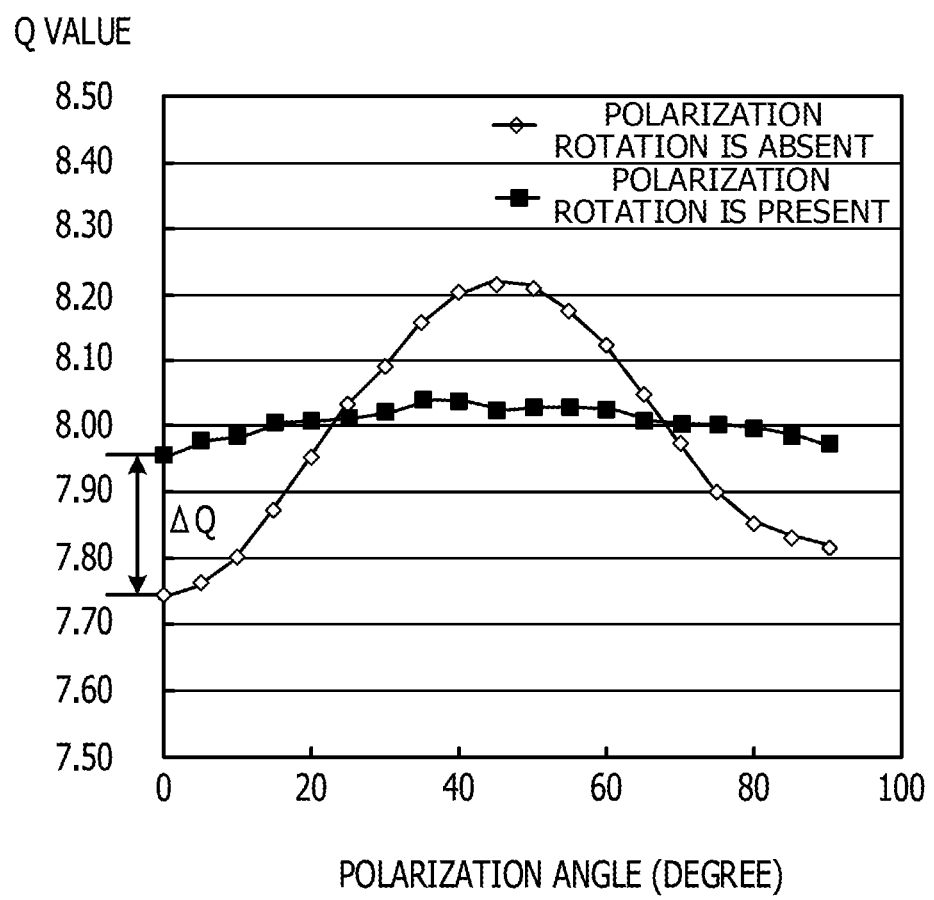
FIG. 10 is a view illustrating a simulation result about a change in a Q value with respect to a receiver-side polarization angle.

FIG. 10 is a view illustrating a simulation result about a change in a Q value with respect to the receiver-side polarization angle. In FIG. 10, a horizontal axis represents the rotational angle of the polarized light beams Sh, Sv in the transmission line 91, and changes by 5 degrees in the range of 0 to 90 degrees. A vertical axis represents the Q value calculated from an average value of bit error rate (BER) of each of the electric field signals Eh, Ev in the receiver 92.

In the simulation, it is assumed that TS and PS are inserted as represented in FIG. 5, and in the transmission line 91, the optical signal-to-noise ratio (OSNR) is 16 (dB) and PDL is 5 (dB). In FIG. 10, a diamond-shaped point represent the Q value in the absence of polarization rotation (see the sign Ga in FIG. 2), and a rectangular point represent the Q value in the presence of polarization rotation (see the sign Gb in FIG. 2). In the presence of polarization rotation, the polarization angle transformation unit 802 rotates the polarized light beams Sh, Sv by 45 degrees every time Ta, Tb of one symbol.

As apparent from FIG. 10, as compared with the Q value in the absence of polarization rotation, the Q value in the presence of polarization rotation is more averaged due to the effect of polarization rotation. A difference ΔQ between the minimum Q values in the presence of polarization rotation and in the absence of polarization rotation is about 0.2 (dB), and signal degradation caused by PDL is reduced.

In this example, the transmitter 90 uses TS and PS, and however, may use polarization information indicating a change amount of each polarization angle of the polarized light beams Sh, Sv, which is caused by the rotation processing.

Figure 11:
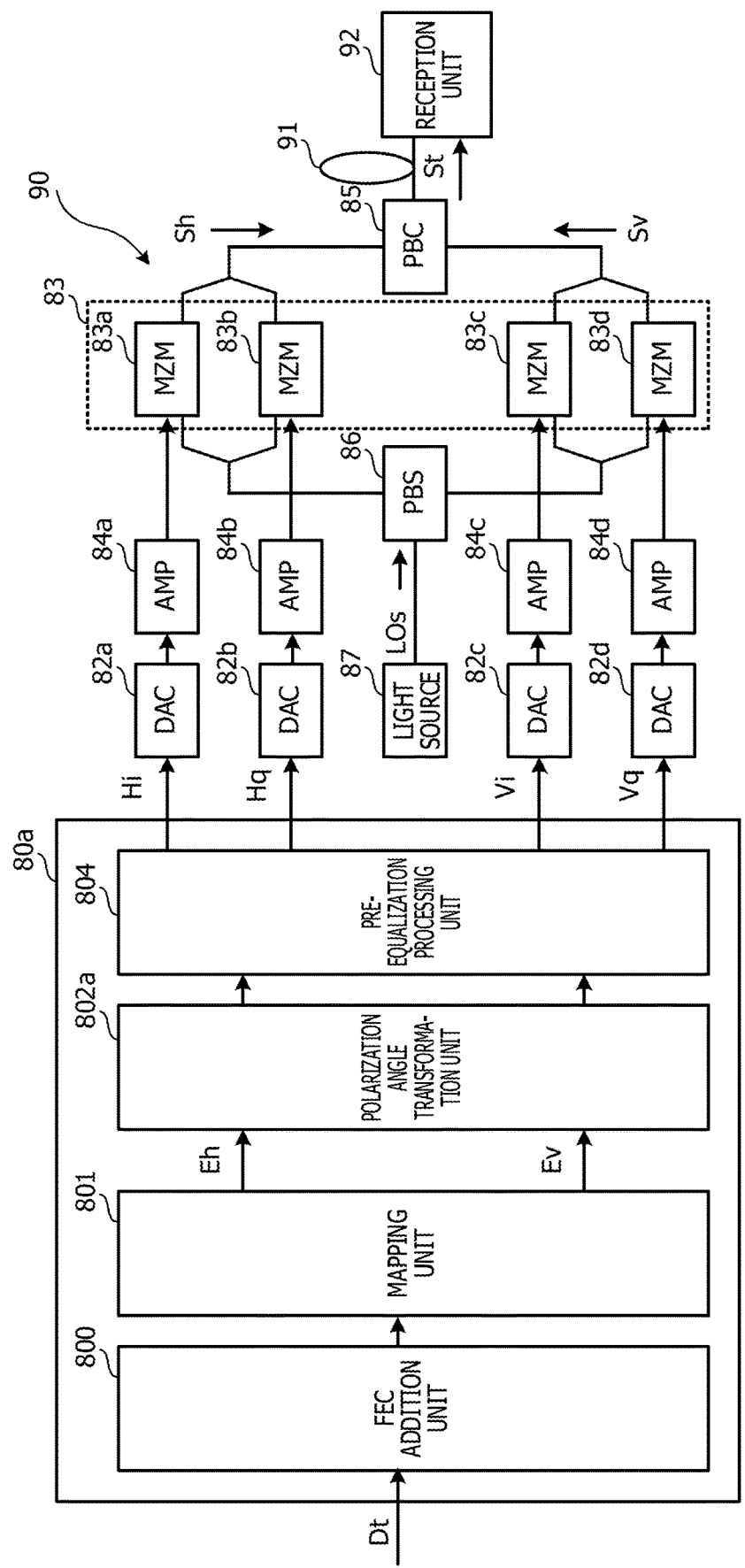
FIG. 11 is a configuration view illustrating another example of the transmitter.

FIG. 11 is a configuration view illustrating another example of the transmitter 90. The same constituents in FIG. 11 as those in FIG. 1 are given the same reference numerals, and description thereof is omitted.

As compared with FIG. 1, in the transmitter 90, a transmission processing circuit 80a is provided in place of the transmission processing circuit 80. The transmission processing circuit 80a has a FEC addition unit 800, a mapping unit 801, a polarization angle transformation unit 802a, and a pre-equalization processing unit 804, and unlike the transmission processing circuit 80, the transmission processing circuit 80a has no signal insertion units 803a, 803b. The polarization angle transformation unit 802a is an example of a transformation unit that executes transformation processing of changing the polarization angle.

Figure 12:
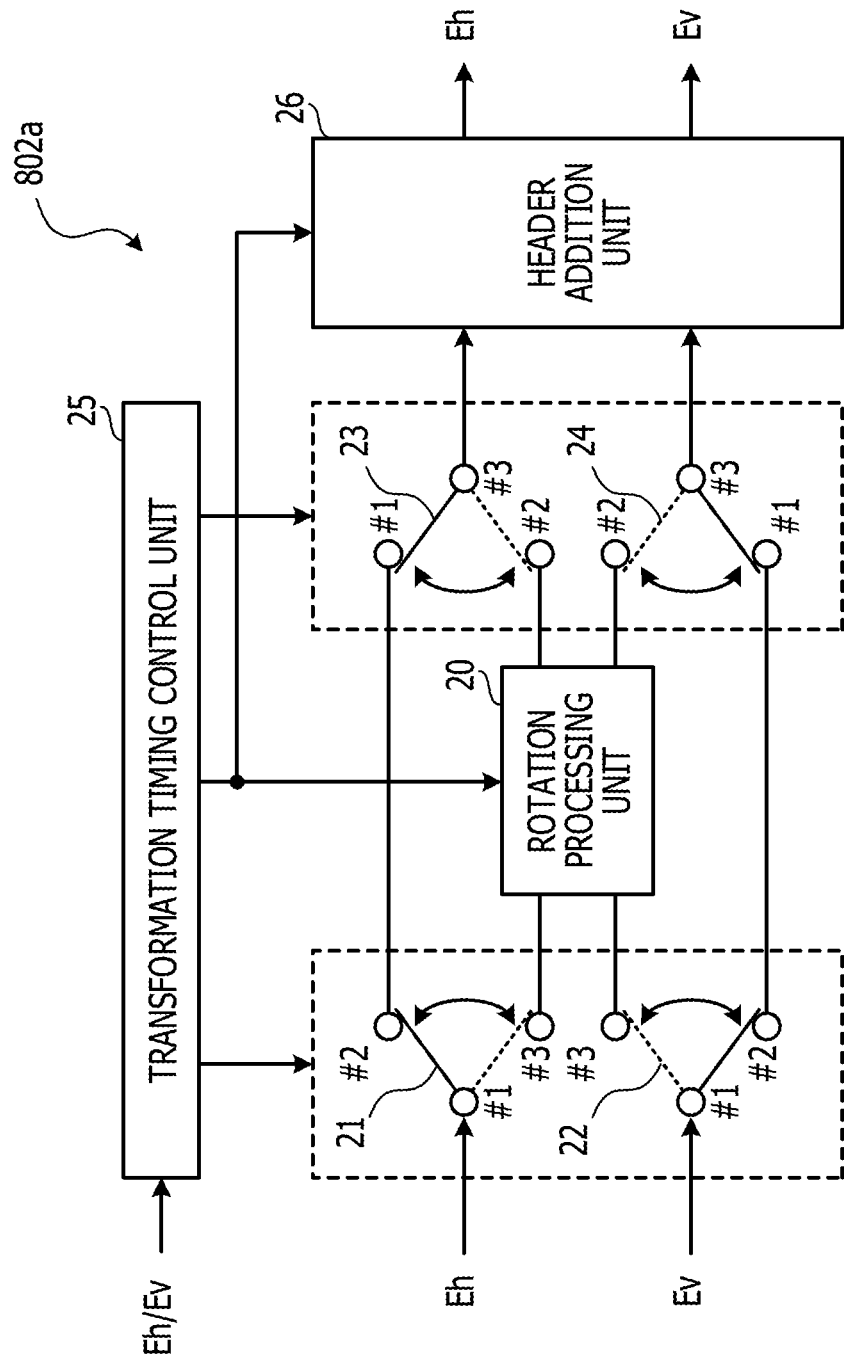
FIG. 12 is a configuration view illustrating another polarization angle transformation unit.

FIG. 12 is a configuration view illustrating another polarization angle transformation unit 802a. The same constituents in FIG. 12 as those in FIG. 3 are given the same reference numerals, and description thereof is omitted. As compared with FIG. 3, the polarization angle transformation unit 802a is also provided with a header addition unit 26.

The header addition unit 26 adds a header including polarization information to the electric field signals Eh, Ev outputted from the polarization angle transformation unit 802*a*. The polarization information indicates a change amount caused by transformation processing of the polarization angle of the polarized light beams Sh, Sv, that is, the above-mentioned rotational angle θ.

Figure 13:
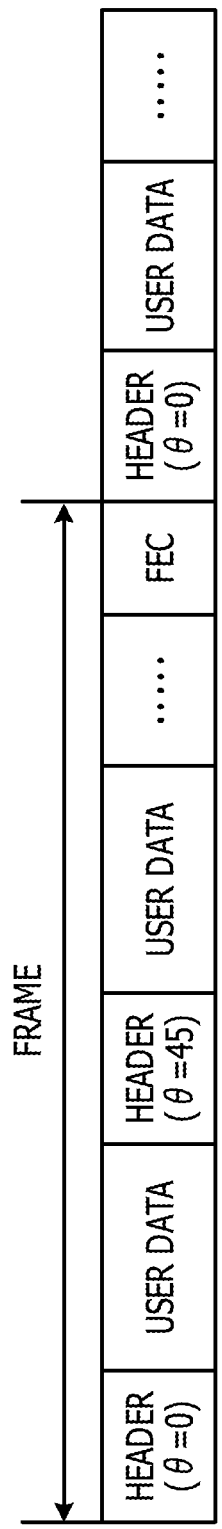
FIG. 13 is a configuration view illustrating another example of the optical signal.

FIG. 13 is a configuration view illustrating another example of the optical signal St. The header is inserted in a boundary of each frame, at which the polarization angle is switched. For example, in the case of the example expressed by the sign Gb in FIG. 2, the rotational angle θ indicated by the polarization information in the header alternately represents 0 degree and 45 degrees.

The receiver 92 acquires the polarization information, thereby using the constellation corresponding to the rotational angle θ to execute the demodulation processing from user data.

FIG. 14 is a view illustrating an example of constellation. In this example, the modulation mode is assumed to be QPSK.

The sign Gd indicates the constellation in the case where the rotational angle θ is 0+n×(π/2) (rad) (n is an integer). This constellation is normal constellation of QPSK, and is used in the demodulation processing in the case where the polarization angle of the polarized light beams Sh, Sv is not subjected to transformation processing (θ=0 degree).

The sign Ge indicates the constellation in the case where the rotational angle θ is π/4+n×(π/2) (rad). This constellation is acquired from the intensity and phase of the signal when the polarized light beams Sh, Sv having the rotational angle θ of π/4+n×(π/2) (rad) are projected on the H axis and the V axis, and is used in the demodulation processing when the polarization angle of the polarized light beams Sh, Sv is rotated by 45 degrees (θ=45 degrees).

The sign Gf indicates the constellation in the case where the rotational angle θ of π/4+n×(π/2) (rad). This constellation is acquired from the intensity and phase of the signal when the polarized light beams Sh, Sv having the rotational angle θ of π/4+n×(π/2) (rad) are projected on the H axis and the V axis, and is used in the demodulation processing when the polarization angle of the polarized light beams Sh, Sv is rotated 30 degrees or 60 degrees (θ=30 degrees or 60 degrees).

When the rotational angle θ changes, the number of symbols (the number of points) of the constellation increases. The number of symbols is four in the case of the rotational angle θ of 0+n×(π/2) (rad) is four, while the number of symbols in the case of the rotational angle θ of π/4+n×(π/2) (rad) increases to nine, and the number of symbols in the case of the rotational angle θ of π/6+n×(π/2) (rad) increases to 16.

Figure 15:
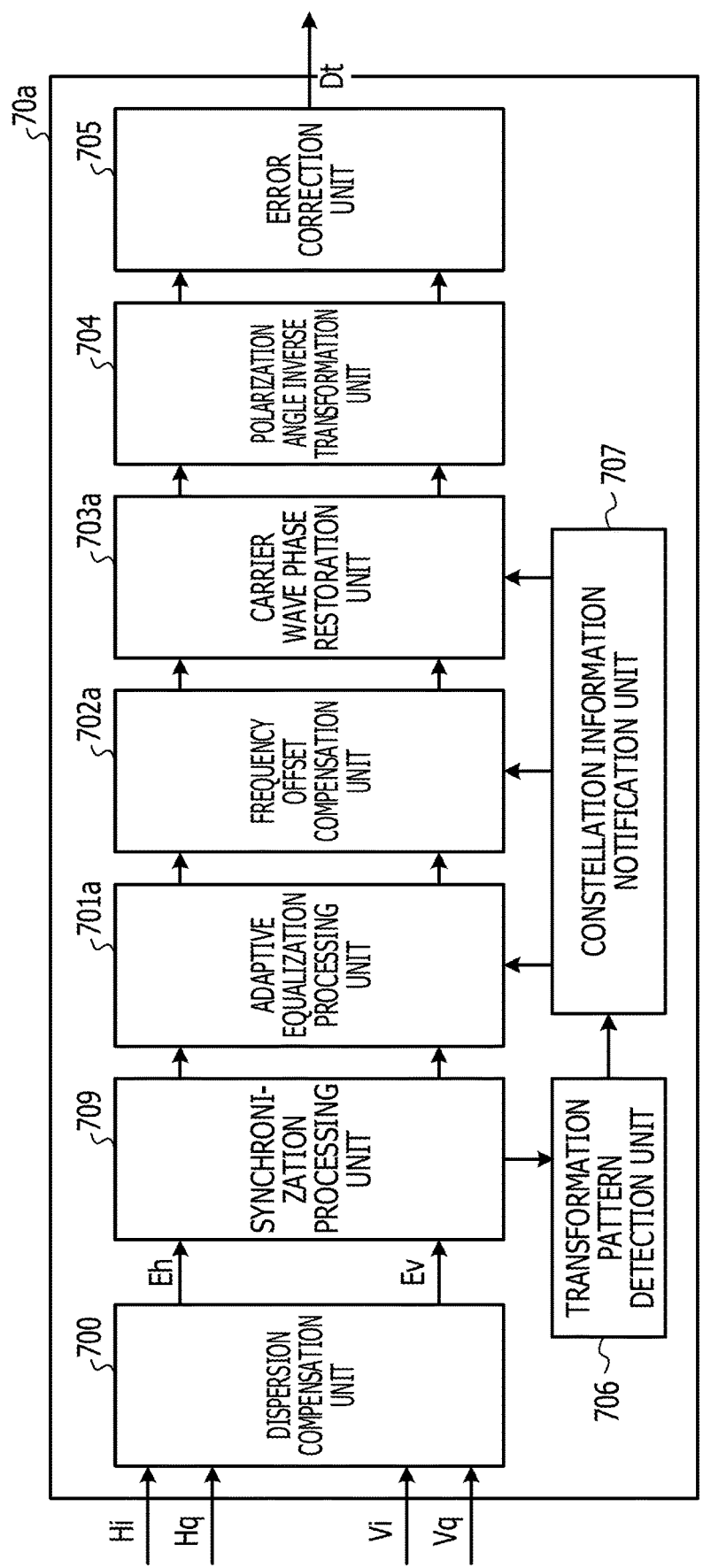
FIG. 15 is a configuration view of another reception processing circuit.

FIG. 15 is a configuration view illustrating another reception processing circuit 70*a*. The same constituents in FIG. 15 as those in FIG. 6 are given the same reference numerals, and description thereof is omitted. The reception processing circuit 70*a* has a dispersion compensation unit 700, a synchronization processing unit 709, an adaptive equalization processing unit 701*a*, a frequency offset compensation unit 702*a*, a carrier wave phase restoration unit 703*a*, a polarization angle inverse transformation unit 704, an error correction unit 705, a transformation pattern detection unit 706, and a constellation information notification unit 707.

The synchronization processing unit 709 detects the header in the electric field signals Eh, Ev, thereby executing synchronization processing. The synchronization processing unit 709 outputs information in the header to the transformation pattern detection unit 706.

The transformation pattern detection unit 706 extracts the polarization information from the information in the header, and identifies a polarization angle transformation pattern based on the polarization information. The polarization angle transformation pattern refers to the rotational angle θ of the polarized light beams Sh, Sv corresponding to the electric field signals Eh, Ev to be modulated. The transformation pattern detection unit 706 notifies the polarization angle transformation pattern to the constellation information notification unit 707.

The constellation information notification unit 707 holds constellation information indicating each constellation illustrated in FIG. 14. The constellation information notification unit 707 notifies the constellation information corresponding to the polarization angle transformation pattern to the adaptive equalization processing unit 701*a*, the frequency offset compensation unit 702*a*, and the carrier wave phase restoration unit 703*a*.

Like the adaptive equalization processing unit 701, the frequency offset compensation unit 702, and the carrier wave phase restoration unit 703, the adaptive equalization processing unit 701*a*, the frequency offset compensation unit 702*a*, and the carrier wave phase restoration unit 703*a* also execute the same demodulation processing as described above, based on the constellation information.

For example, the adaptive equalization processing unit 701*a*, the frequency offset compensation unit 702*a*, and the carrier wave phase restoration unit 703*a* applies the demodulation processing to the electric field signals Eh, Ev having the rotational angle θ=0 degree using the constellation expressed by the sign Gd in FIG. 14. The adaptive equalization processing unit 701*a*, the frequency offset compensation unit 702*a*, and the carrier wave phase restoration unit 703*a* applies the demodulation processing to the electric field signals Eh, Ev having the rotational angle θ=45 degrees using the constellation expressed by the sign Ge in FIG. 14. The adaptive equalization processing unit 701*a*, the frequency offset compensation unit 702*a*, and the carrier wave phase restoration unit 703*a* applies the demodulation processing to the electric field signals Eh, Ev having the rotational angle θ=30 degrees or 60 degrees using the constellation expressed by the sign Gf in FIG. 14.

In this manner, the adaptive equalization processing unit 701*a*, the frequency offset compensation unit 702*a*, and the carrier wave phase restoration unit 703*a* demodulate the electric field signals Eh, Ev based on the polarization information. Accordingly, the receiver 92 may execute the demodulation processing at low loads based on the polarization information.

In this example, the adaptive equalization processing unit 701*a*, the frequency offset compensation unit 702*a*, and the carrier wave phase restoration unit 703*a* applies the demodulation processing to all of the electric field signals Eh, Ev irrespective of the rotational angle θ and however, may apply the demodulation processing to only the electric field signals Eh, Ev having a particular rotational angle θ.

Figure 16:
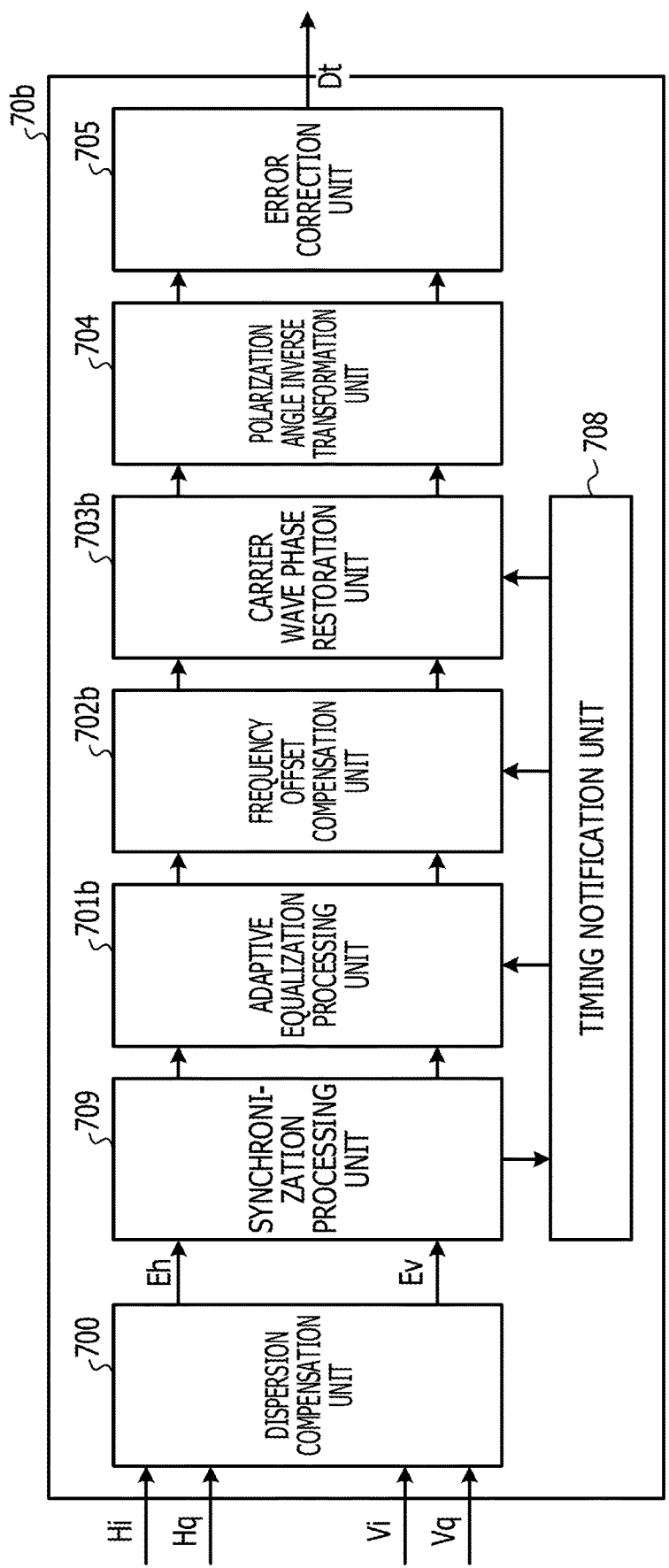
FIG. 16 is a configuration view of another reception processing circuit.

FIG. 16 is a configuration view illustrating another reception processing circuit 70*b*. The same constituents in FIG. 16 as those in FIG. 6 are given the same reference numerals, and description thereof is omitted. The reception processing circuit 70*b* has a dispersion compensation unit 700, a synchronization processing unit 709, an adaptive equalization processing unit 701*b*, a frequency offset compensation unit 702*b*, a carrier wave phase restoration unit 703*b*, a polarization angle inverse transformation unit 704, an error correction unit 705, and a timing notification unit 708.

The adaptive equalization processing unit 701b, the frequency offset compensation unit 702b, and the carrier wave phase restoration unit 703b applies the demodulation processing to only the electric field signals Eh, Ev having a particular rotational angle θ. For example, the adaptive equalization processing unit 701b executes update processing of the tap coefficient based on the electric field signals Eh, Ev having a particular rotational angle θ, the frequency offset compensation unit 702b determines the frequency difference and the phase difference based on the electric field signals Eh, Ev having a particular rotational angle θ, and the carrier wave phase restoration unit 703b estimates the carrier wave phase based on the electric field signals Eh, Ev having a particular rotational angle θ.

The timing notification unit 708 detects that the electric field signals Eh, Ev having a particular rotational angle θ are inputted from the polarization information, and notifies the timing at which each of the adaptive equalization processing unit 701b, the frequency offset compensation unit 702b, and the carrier wave phase restoration unit 703b executes the demodulation processing. Then, the adaptive equalization processing unit 701b, the frequency offset compensation unit 702b, and the carrier wave phase restoration unit 703b each execute the demodulation processing using the constellation corresponding to the particular rotational angle θ at the notified timing.

For this reason, in this example, the function of holding a plurality of pieces of constellation information, such as the constellation information notification unit 707, becomes unnecessary. This may reduce the size of a memory circuit of the reception processing circuit 70b.

The timing notification unit 708 in this example detects the timing at which the electric field signals Eh, Ev having a particular rotational angle θ and however, may notify the timing of the demodulation processing at a time interval of a certain number of headers, irrespective of the rotational angle θ.

Figure 17:
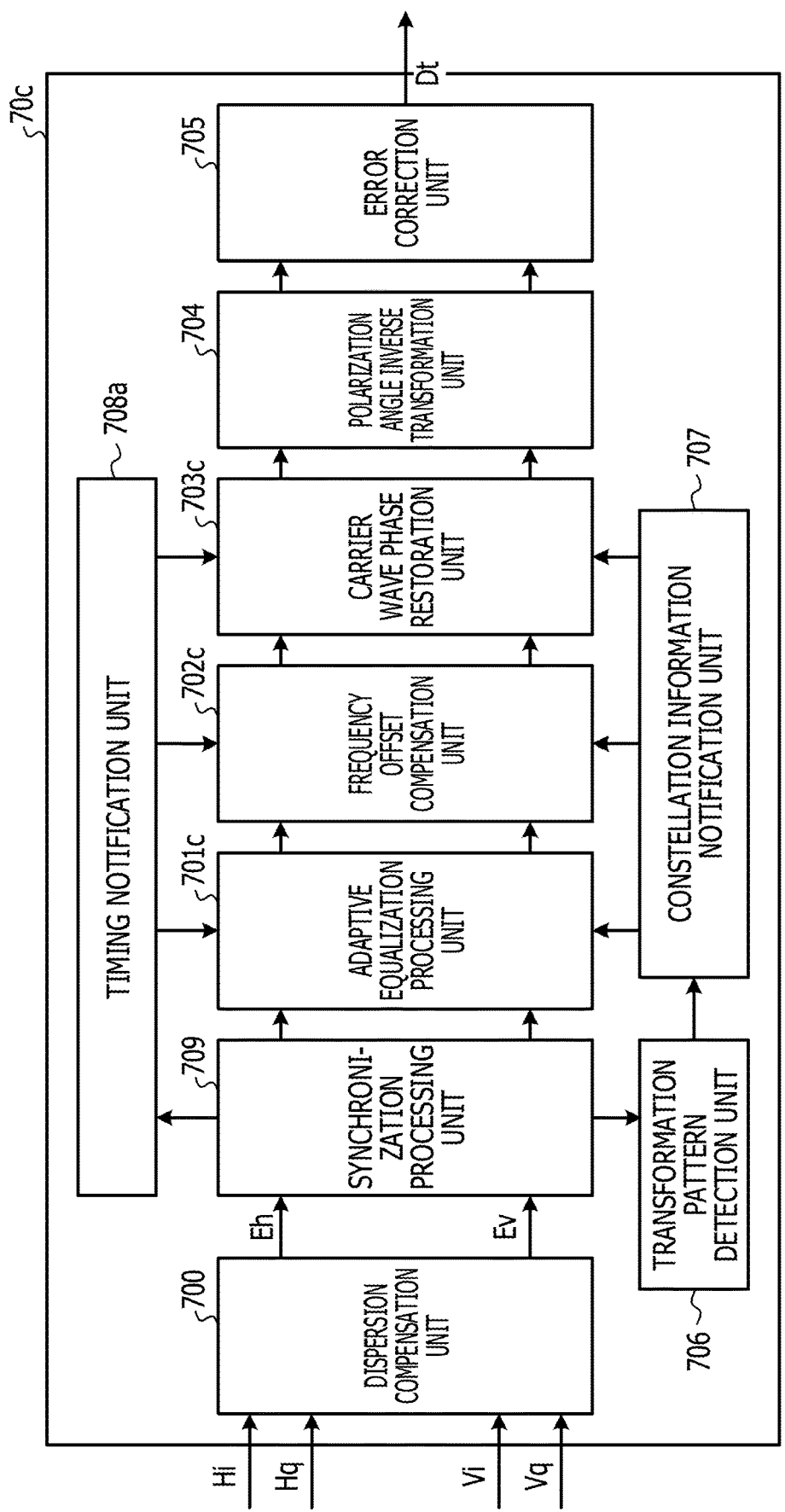
FIG. 17 is a configuration view of another reception processing circuit.

FIG. 17 is a configuration view illustrating another reception processing circuit 70c. The same constituents in FIG. 17 as those in FIG. 15 are given the same reference numerals, and description thereof is omitted. The reception processing circuit 70c has a dispersion compensation unit 700, a synchronization processing unit 709, an adaptive equalization processing unit 701c, a frequency offset compensation unit 702c, a carrier wave phase restoration unit 703c, a polarization angle inverse transformation unit 704, an error correction unit 705, a timing notification unit 708a, a transformation pattern detection unit 706, and a constellation information notification unit 707.

The timing notification unit 708a notifies the timing of the demodulation processing, for example, at a time interval of a certain number of headers to the adaptive equalization processing unit 701c, the frequency offset compensation unit 702c, and the carrier wave phase restoration unit 703c.

When receiving the notification, the adaptive equalization processing unit 701c, the frequency offset compensation unit 702c, and the carrier wave phase restoration unit 703c executes the demodulation processing based on the constellation information notified from the constellation information notification unit 707.

In this example, the time interval of the demodulation processing may be suppressed from becoming excessively large, to suppress transmission quality.

In the above Example, transformation of the polarization angle about the polarized light beams Sh, Sv is described as an example of unitary transformation and however, unitary transformation may be made between symbols at different timings.

Figure 18:
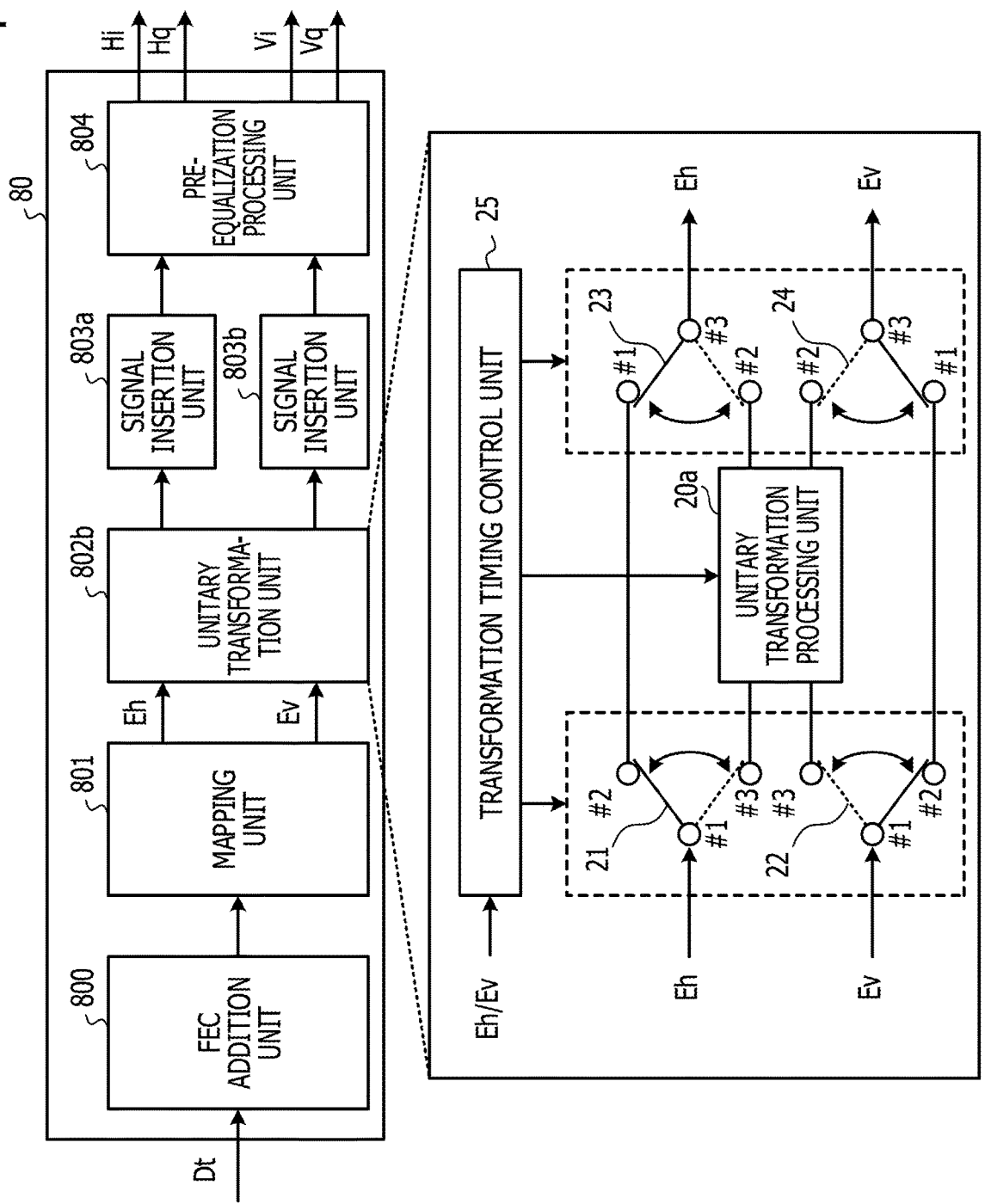
FIG. 18 is a configuration view illustrating another example of the transmission processing circuit.

FIG. 18 is a configuration view illustrating another example of the transmission processing circuit 80. The same constituents in FIG. 18 as those in FIGS. 1 and 3 are given the same reference numerals, and description thereof is omitted. As compared with the transmission processing circuit 80 in FIG. 1, the transmission processing circuit 80 is provided with a unitary transformation unit 802b in place of the polarization angle transformation unit 802.

The unitary transformation unit 802b is an example of a transformation unit that applies unitary transformation to the electric field signals Eh, Ev between symbols at different timings. The unitary transformation unit 802b is provided with a unitary transformation processing unit 20a in place of the rotation processing unit 20 in FIG. 3.

The unitary transformation processing unit 20a applies transformation processing in the unit of symbol to the electric field signals Eh, Ev. As an example, given that the electric field signals Eh, Ev correspond to symbols Syh, Syv, respectively, the unitary transformation processing unit 20a transforms the electric field signals Eh, Ev using a predetermined transformation mode between the symbol Syh (t1) generated at a time t1 and the symbol Syv (t2) generated at a time t2(≠t1) in the mapping unit 801. Such transformation includes, not limited to, Hadamard transformation.

The unitary transformation processing unit 20a is not limited to a pair of symbols corresponding to the electric field signals Eh, Ev, and may execute the transformation processing between plural pairs of symbols Syh, Syv at different timings.

$$Eh'=(Eh+Ev)/2^{1/2} \qquad (5)$$

$$Ev'=(Ev^*+Ev^*)/2^{1/2} \qquad (6)$$

As an example, the unitary transformation processing unit 20a may execute the transformation processing in a complex number area using the above-mentioned formulas (5), (6). In the formulas (5), (6), Eh', Ev' represent the transformed electric field signals Eh, Ev, and Eh*, Ev* represent electric field signals that are the complex conjugates of the electric field signals Eh, Ev.

As in the above Example, such transformation processing averages the effect of polarization dependency of the transmission line 91 on the optical signal St to decrease PDL.

FIG. 19 is a configuration view illustrating another reception processing circuit 70. The same constituents in FIG. 19 as those in FIGS. 6 and 7 are given the same reference numerals, and description thereof is omitted. The reception processing circuit 70 corresponds to the transmission processing circuit 80 in this example.

As compared with FIG. 6, in the reception processing circuit 70, an inverse transformation unit 704a is provided in place of the polarization angle inverse transformation unit 704. The inverse transformation unit 704a applies the transformation processing that is inverse to the unitary transformation of the unitary transformation processing unit 20a, to each of the electric field signal Ev, Eh. The inverse transformation unit 704a is provided with an inverse transformation processing part 30a in place of the inverse rotation processing unit 30 in FIG. 7.

The inverse transformation unit 704a executes the transformation processing that is inverse to the processing of the unitary transformation processing unit 20a. As a result, the unitary transformed parts of the electric field signals Eh, Ev are returned to the initial state.

The above-mentioned embodiments are exemplary preferred examples of the present disclosure. However, the present disclosure is not limited to the embodiments, and the embodiments may be variously modified so as not to deviate from the subject matter of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
   a transmission processing circuit configured to map a data signal to a symbol according to a modulation mode to generate a first electric field signal and a second electric field signal;
   a modulator configured to optically modulate a light beam based on the first electric field signal and the second electric field signal to generate a first polarized light beam and a second polarized light beam that are orthogonal to each other; and
   a multiplexer configured to multiplex the first polarized light beam and the second polarized light beam, wherein
   the transmission processing circuit applies unitary transformation regarding the first polarized light beam and the second polarized light beam, or unitary transformation between symbols at different timings, to the first electric field signal and the second electric field signal, inserts a first reference signal having a predetermined pattern used in demodulation processing of the first electric field signal in the first electric field signal subjected to the unitary transformation, and inserts a second reference signal having a predetermined pattern used in demodulation processing of the second electric field signal in the second electric field signal subjected to the unitary transformation.

2. The transmission device according to claim 1, wherein the transmission processing circuit applies transformation processing of changing each polarization angle of the first polarized light beam and the second polarized light beam to the first electric field signal and the second electric field signal.

3. The transmission device according to claim 2, wherein the transmission processing circuit intermittently execute the transformation processing.

4. The transmission device according to claim 3, wherein the transmission processing circuit executes transformation processing of continuously changing each polarization angle of the first polarized light beam and the second polarized light beam from a predetermined angle to a plurality of angles.

5. The transmission device according to claim 1, further comprising:
   a front end circuit configured to receive a polarized multiplexed light beam of the first polarized light beam and the second polarized light beam, divide the polarized multiplexed light beam into the first polarized light beam and the second polarized light beam, and transform the first polarized light beam and the second polarized light beam into the first electric field signal and the second electric field signal, respectively; and
   a reception processing circuit configured to demodulate the first electric field signal based on the first reference signal, and demodulate the second electric field signal based on the second reference signal, wherein
   the reception processing circuit applies transformation processing that is inverse to the unitary transformation to the first electric field signal and the second electric field signal.

6. The transmission device according to claim 5, wherein the reception processing circuit
   executes error correction processing of the data signal by soft decision based on an error correction code added to the data signal,
   calculates a parameter used in the soft decision regarding the first electric field signal that is not subjected to the unitary transformation based on power level of the first reference signal,
   calculates a parameter used in the soft decision regarding the first electric field signal that is subjected to the unitary transformation based on power level of the first reference signal,
   calculates a parameter used in the soft decision regarding the second electric field signal that is not subjected to the unitary transformation based on power level of the second reference signal, and
   calculates a parameter used in the soft decision regarding the second electric field signal that is subjected to the unitary transformation based on power level of the second reference signal.

7. A transmission device comprising:
   a transmission processing circuit configured to map a data signal to a symbol according to a modulation mode to generate a first electric field signal and a second electric field signal;
   a modulator configured to optically modulate a light beam based on the first electric field signal and the second electric field signal to generate a first polarized light beam and a second polarized light beam that are orthogonal to each other; and
   a multiplexer configured to multiplex the first polarized light beam and the second polarized light beam, wherein
   the transmission processing circuit
   applies transformation processing of changing each polarization angle of the first polarized light beam and the second polarized light beam to the first electric field signal and the second electric field signal, and
   adds polarization information indicating a change amount caused by the transformation processing for each polarization angle of the first polarized light beam and the second polarized light beam to the first electric field signal and the second electric field signal.

8. The transmission device according to claim 7, further comprising:
   a front end circuit configured to receive a polarized multiplexed light beam of the first polarized light beam and the second polarized light beam, divide the polarized multiplexed light beam into the first polarized light beam and the second polarized light beam, and transform the first polarized light beam and the second polarized light beam into the first electric field signal and the second electric field signal, respectively; and
   a reception processing circuit configured to demodulate the first electric field signal and the second electric field signal based on the polarization information, wherein the reception processing circuit applies transformation processing that is inverse to the transformation processing to the first electric field signal and the second electric field signal.

9. A transmission method comprising:

mapping a data signal to a symbol according to a modulation mode to generate a first electric field signal and a second electric field signal;

optically modulating a light beam based on the first electric field signal and the second electric field signal to generate a first polarized light beam and a second polarized light beam that are orthogonal to each other;

multiplexing the first polarized light beam and the second polarized light beam;

applying unitary transformation regarding the first polarized light beam and the second polarized light beam, or unitary transformation between the symbols at different timings to the first electric field signal and the second electric field signal;

inserting a first reference signal having a predetermined pattern used in demodulation processing of the first electric field signal in the first electric field signal that is subjected to the unitary transformation; and inserting a second reference signal having a predetermined pattern used in demodulation processing of the second electric field signal in the second electric field signal that is subjected to the unitary transformation.

10. The transmission method according to claim 9, wherein the unitary transformation is transformation processing applied to the first electric field signal and the second electric field signal to change each polarization angle of the first polarized light beam and the second polarized light beam.

11. The transmission method according to claim 10, wherein the transformation processing is intermittently executed.

12. The transmission method according to claim 11, wherein the transformation processing is transformation processing of continuously changing each polarization angle of the first polarized light beam and the second polarized light beam from a predetermined angle to a plurality of angles.

13. The transmission method according to claim 9, further comprising:

receiving a polarized multiplexed light beam of the first polarized light beam and the second polarized light beam, dividing the polarized multiplexed light beam into the first polarized light beam and the second polarized light beam, and transforming the first polarized light beam and the second polarized light beam into the first electric field signal and the second electric field signal, respectively;

demodulating the first electric field signal based on the first reference signal, and demodulating the second electric field signal based on the second reference signal; and applying transformation processing that is inverse to the unitary transformation to the first electric field signal and the second electric field signal.

14. The transmission method according to claim 13, further comprising:

executing error correction processing of the data signal by soft decision based on an error correction code added to the data signal, calculating a parameter used in the soft decision regarding the first electric field signal that is not subjected to the unitary transformation based on power level of the first reference signal, calculating a parameter used in the soft decision regarding the first electric field signal that is subjected to the unitary transformation based on power level of the first reference signal, calculating a parameter used in the soft decision regarding the second electric field signal that is not subjected to the unitary transformation based on power level of the second reference signal, and calculating a parameter used in the soft decision regarding the second electric field signal that is subjected to the unitary transformation based on power level of the second reference signal.

15. A transmission method comprising:

mapping a data signal to a symbol according to a modulation mode to generate a first electric field signal and a second electric field signal;

optically modulating a light beam based on the first electric field signal and the second electric field signal to generate a first polarized light beam and a second polarized light beam that are orthogonal to each other;

multiplexing the first polarized light beam and the second polarized light beam;

applying transformation processing of changing each polarization angle of the first polarized light beam and the second polarized light beam to the first electric field signal and the second electric field signal; and adding polarization information indicating a change amount caused by the transformation processing for each polarization angle of the first polarized light beam and the second polarized light beam to the first electric field signal and the second electric field signal.

* * * * *